United States Patent
Giaffreda et al.

(10) Patent No.: US 7,305,474 B2
(45) Date of Patent: Dec. 4, 2007

(54) METHOD OF DATA TRANSFER IN MOBILE AND FIXED TELECOMMUNICATIONS SYSTEMS

(75) Inventors: Raffaele Giaffreda, Ipswich (GB); Terence G Hodgkinson, Woodbridge (GB)

(73) Assignee: British Telecommunications, London (GB)

( * ) Notice: Subject to any disclaimer, the term of this patent is extended or adjusted under 35 U.S.C. 154(b) by 385 days.

(21) Appl. No.: 10/508,420

(22) PCT Filed: Mar. 26, 2003

(86) PCT No.: PCT/GB03/01345

§ 371 (c)(1),
(2), (4) Date: Sep. 21, 2004

(87) PCT Pub. No.: WO03/084171

PCT Pub. Date: Oct. 9, 2003

(65) Prior Publication Data

US 2005/0154774 A1   Jul. 14, 2005

(30) Foreign Application Priority Data

Mar. 28, 2002 (GB) .................... 0207454.0

(51) Int. Cl.
*G06F 15/16* (2006.01)
*H04L 29/06* (2006.01)
*H04Q 7/20* (2006.01)
*H04Q 7/24* (2006.01)

(52) U.S. Cl. ........... 709/227; 455/432.2; 455/422.1; 455/436; 370/338

(58) Field of Classification Search ............... None
See application file for complete search history.

(56) References Cited

U.S. PATENT DOCUMENTS 5,887,256 A   3/1999   Lu et al.
6,125,282 A   9/2000   Urabe (Continued)

FOREIGN PATENT DOCUMENTS

EP   0772319 A2   5/1997

(Continued)

OTHER PUBLICATIONS

Snoeren et al., "An End-to-End Approach to Host Mobility", 6th ACM/IEEE International Conference on Mobile Computing and Networking (MobiCom 2000).

*Primary Examiner*—Wen-Tai Lin
(74) *Attorney, Agent, or Firm*—Nixon & Vanderhye P.C.

(57) ABSTRACT

Data is transferred between mobile or fixed end devices connected to respective base stations. A first session identifier (session ID) is selected from a first array for sessions originating from an initiating end device. Data is transferred as a plurality of packets each of which contains the first session ID to a remote end device connected to a remote base station, the remote base station being configured to: allocate a second session ID from a second array, map to one another the said first and second session IDs, and, a forward the said second session ID to the remote end device. In this way, the mapping between session IDs need not be stored in the end devices, allowing for a session to be handed over from one end device to another end device where both end devices are connected to the same base station.

24 Claims, 17 Drawing Sheets

U.S. PATENT DOCUMENTS

| | | |
|---|---|---|
| 6,201,962 B1 | 3/2001 | Sturniolo et al. |
| 2002/0169984 A1* | 11/2002 | Kumar et al. ................ 713/201 |
| 2003/0055982 A1* | 3/2003 | Noro et al. .................. 709/227 |

FOREIGN PATENT DOCUMENTS

| | | |
|---|---|---|
| EP | 1150521 A1 | 10/2001 |
| WO | WO 96/27994 | 9/1996 |
| WO | WO 00/35151 | 6/2000 |
| WO | WO 00/44147 | 7/2000 |
| WO | WO 00/52884 | 9/2000 |
| WO | WO 01/78322 A2 | 10/2001 |
| WO | WO 01/91389 A2 | 11/2001 |

* cited by examiner

END DEVICE INFORMATION TABLE

Channel Information
Channel ID allocated to this end device

Device Profile
Device name(s)
Well-known port numbers supported
IP enabled device or not
Maximum number of remotely originated simultaneous sessions allowed

Session Information
Active Sessions
    Session_IDorig --- Application memory location
Local IDs for Locally Originated Sessions
    Available ---- Session_IDorig

FIGURE 2

Base Station Information Table

Sending
Channel ---- Local IP address
    Locally Originated Sessions
        Local Session_IDorig ---- Remote IP address, remote device IP enabled, well-known port number Remotely Originated Sessions
        Local Session_IDrec ----Remote IP address, Remote Session_IDorg, remote device IP enabled, well-known port number

Receiving
Local IP address ---- Channel N
    Locally Originated Sessions
        Local Session_IDorig ---- well-known port number

Remotely Originated Sessions
        Remote IP address
        Remote Session_IDorig - Local Session_IDrec, well-known port number

End Device Information
        General Information
            Well-known port numbers supported
            Maximum number of remotely originated simultaneous sessions allowed

Local IDs for Remotely Originated Sessions
        Available ---Local Session_IDorig

FIGURE 3

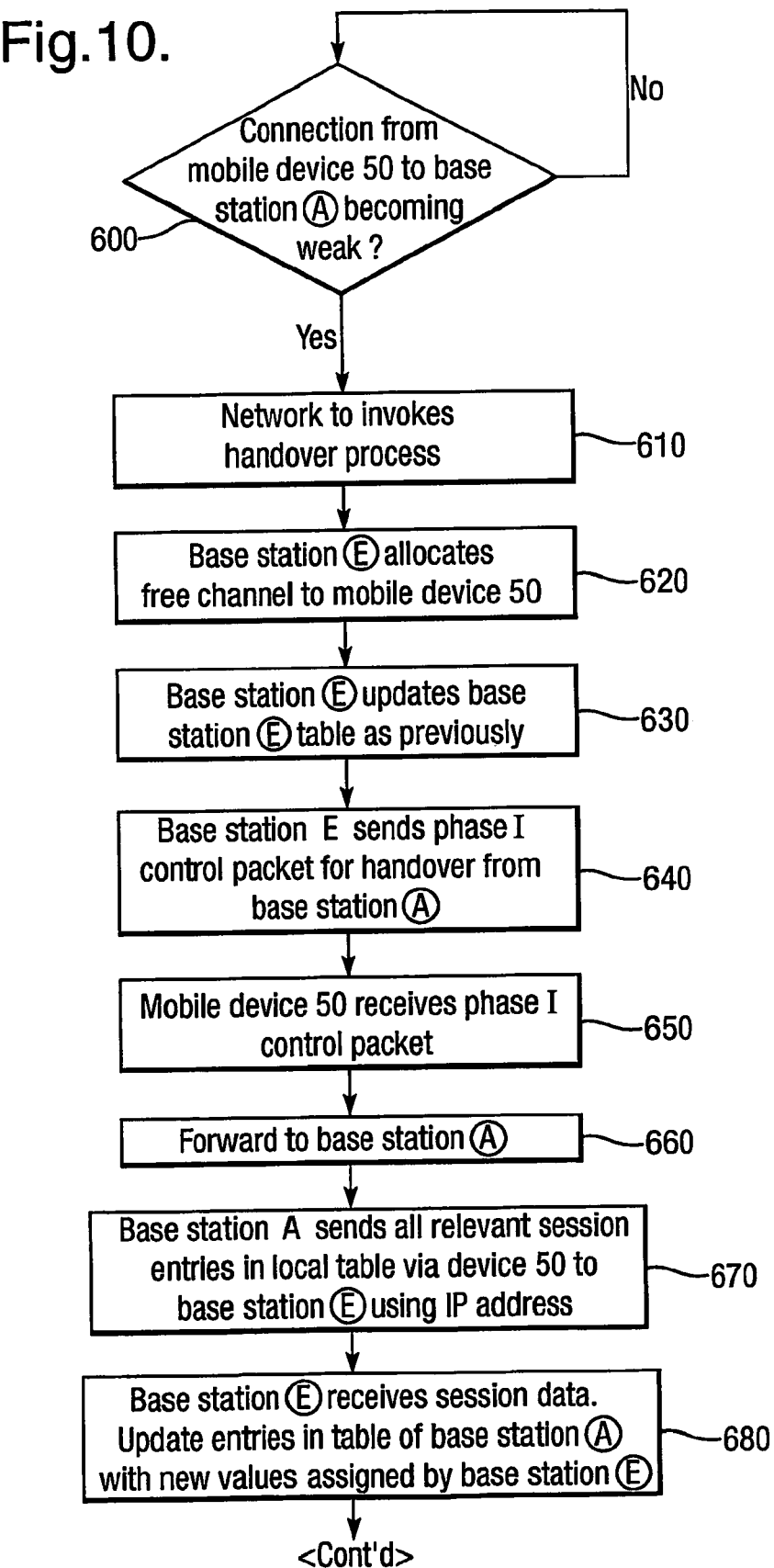

END DEVICE INFORMATION TABLE (MODIFIED)

Channel Information
Channel ID allocated to this end device

Device Profile
Device name(s)
Well-known port numbers supported
IP enabled device or not
Maximum number of remotely originated simultaneous sessions allowed
Device Type (ie user or network device )

Session Information
Active Sessions
    Session_IDorig ---- Application memory location
Local IDs for Locally Originated Sessions
    Available ---- Session_IDorig

FIGURE 13

Base Station Information Table (Modified)

Sending
Channel ---- Local IP address
    Locally Originated Sessions
        Local session_IDorig ---- Remote IP address, remote device IP enabled, well-known port number

Remotely Originated Sessions
        Local session_IDrec ---- Remote IP address, Remote Session_IDorg, remote device IP enabled, well-known port number

Receiving
Master Device Local IP address ---- Channel N
    Locally Originated Sessions
        Local Session_IDorig
            <u>Well-known Device ID (z)</u> □ <u>channel z</u>
            <u>Well-known Device ID (y)</u> □ <u>channel y</u>

Remotely Originated Sesions
        Remote IP address
        Remote Session_IDorig ---- Local Session_IDrec, well-known port number
            <u>Well-known device ID (x)</u> □ <u>channel (x)</u>
            <u>Well-known device ID (w)</u>□ <u>channel (w)</u>

End Device Information
        General Information
            Well-known port numbers supported
            Maximum number of remotely originated simultaneous sessions allowed
            <u>Well-known device ID's available</u>
        Local IDs for Remotely Originated Sessions
            Available ---- Local Session_IDorig

FIGURE 14

METHOD OF DATA TRANSFER IN MOBILE AND FIXED TELECOMMUNICATIONS SYSTEMS

This application is the U.S. national phase of international application PCT/GB03/01345 filed 26 Mar. 2003 which designated the U.S. and claims benefit of GB 0207454.0, dated 28 Mar. 2002, the entire content of which is hereby incorporated by reference.

BACKGROUND

1. Technical Field

The present invention relates to a method of data transfer in a mobile or a fixed (static) telecommunications system. The invention is particularly suitable for use in a system comprising a heterogeneous mix of mobile and fixed end devices or clients having different connection resources and requirements.

2. Related Art

Protocols developed initially for Internet connection, such as the well known Transmission Control Protocol (TCP), which controls data transfer, and the Internet Protocol (IP), which controls routing, are now largely platform independent and provide robust connections between clients and servers, for example. However, TCP/IP and the associated User Datagram Protocol (UDP) were developed when access to the Internet was almost exclusively from and to fixed nodes.

The advent of laptops, mobile (cellular) telephones, handheld devices (PDAs) and other portable devices for which Internet connection is possible has caused these traditional Protocols to be reconsidered, however.

For example, the Internet Protocol assumes that the end point connection is at a fixed location and thus the IP address, of the form AAA.BBB.CCC.DDD, is bound to the end point computer identifier. The problem with this is that, if the computer moves but the IP address stays the same, there is no information available to the data sender indicating where the computer has moved to. Thus, the IP address must be updated every time a computer moves which results in large delays in data transfer whilst the computer is on the move.

There are a number of further fundamental differences in the manner of operation of mobile and fixed devices. For example, mobile devices tend to have limited power resources (often, a rechargeable battery) which militate against permanent connection and/or high transmission power. Also, wireless transmission and reception of data tends to be more susceptible to interruptions and drop-outs than wired connections, particularly as the mobile device moves around. It is thus particularly desirable that mobile Internet connections are optimised for graceful disconnection when data transmission is interrupted, coupled with rapid and seamless reconnection as soon as it is possible. Between such times, the hibernation should be as efficient as possible.

These issues are discussed in "Reconsidering Internet Mobility" by Snoeren et al, in Proc. 8th Workshop on Hot Topics in operating Systems (HOTOS-VIII).

A large number of approaches to the wireless connection of mobile devices to the Internet have been proposed. For example, the Mobile Internet Protocol (Mobile IP), outlined in Request for Comments (RFC) 2002, suggests the use of a 'home agent' which permits roaming of the mobile device by identifying a static home address regardless of the actual point of connection of the mobile device. Data is tunnelled to and from the mobile device by packet forwarding via a home link to the home agent. This arrangement is transparent to layers in the TCP/IP stack above IP; domain name service (DNS) entries refer to a home address and are not concerned with the actual Internet access point.

Mobile IP version 6, defined in various IETF drafts, suggests a number of improvements to the Mobile Internet Protocol, such as the use of a care-of address which is a temporary address that identifies the current, non-home location of the mobile device's Internet connection node (to reduce triangular routing problems, for example). The problems with mobile IP version 6 include the management at the network level of the use of the home agent which tends to clog up the home network with unnecessary traffic. The need for predictability requires part of the already limited bandwidth resources to be reserved. The tunnelling of all traffic along the tunnel link prevents selection of different or most optimized routes for different data types. Session mobility between different mobile devices is not supported.

Another exemplary approach to address the demands of mobile Internet connections is set out in "An end-to-end Approach to Host Mobility": 6th ACM/IEEE Int. Conf. on Mobile Computing and Networking, 2000. Here, secure dynamic updates to the DNS are employed to track the location of the mobile device so that control over mobility is handed to the mobile device itself. A new set of TCP connection migration protocols are also defined. These include the use of a token which identifies a previously established connection to an address, port pair. The devices at either end of the connection thus need to negotiate to agree upon a value for the identifying token. A previously started TCP connection needs to be restarted when an address change occurs in this technique.

Still a further approach employs Session Layer Mobility Management (SLM) which moves the management of the mobility of the mobile device from the base station or home agent onto the mobile device itself. SLM. operates above TCP and switches TCP streams between connections. SLM has two parts; a session management part which resides on the mobile device and manages dynamic connection during a session, and a location management part which resides within the communications network and assists in device location within the network.

The use of conventional dynamic host configuration protocol (DHCP) to assign IP addresses to mobile devices as they move between base stations requires that any mobile device attached to the network must be IP networking enabled. This places limits on the diversity of devices that can be attached to the network. The techniques outlined in the preceding two documents are likewise constrained by the need for the mobile or other end device to be IP enabled.

"Advocating a remote socket architecture for Internet access using Wireless LANs", Special Issue of MONET on Wireless Internet and Intranet Access (1999) advocates an approach which employs a remote socket architecture. A socket, as will be understood by those skilled in the art, acts to strip out data received in TCP packets and forwards the data to an application. In the other direction, the socket acts to bundle data in a socket buffer into TCP packets. In this document, the proposed architecture locates a socket interface and the TCP/IP stack on a base station of a wireless network, with a user interface on the mobile device. Applications on the mobile device are routed via a local socket module using a Last Hop Protocol.

The base station thus acts as a proxy for the mobile device.

Whilst the architecture described in this document allows communication with or between non IP enabled devices, it does have a number of drawbacks. Only stationary wireless access is considered, so that the difficult problems of mobile device and/or session mobility are not addressed. Moreover, the primary goal of this architecture is the improvement of TCP performance over a wireless link.

BRIEF SUMMARY

It is accordingly an object of the present invention to provide an improved method of data transfer which is suitable for use with a heterogeneous mix of end devices. The invention seeks to provide a method which addresses the different constraints of, say, fixed Internet connections, such as desktop PCs connected to the Internet via a LAN, and also those of mobile devices, including also such devices which are not IP network enabled.

According to an exemplay embodiment of the present invention there is provided a method of communication between end devices connected to a telecommunications network, the network comprising a local network access point having a plurality of assignable communications channels, the method comprising: allocating a communications channel to each of the end devices connected to the network; maintaining, at the local network access point, a local network access point table which cross-references each allocated channel with an identification of the end device to which it is allocated; maintaining, at each end device to which a communication channel has been allocated, an end device table which contains the allocated communications channel identifier for that end device; selecting, at an initiating end device, a first session identifier (session ID) from a first array comprising at least one assignable session ID: adding the first session ID to the end device table of the initiating end device; forwarding the first session ID from the initiating end device to the network access point; forwarding, from the initiating end device to the local network access point, a remote end device identifier, indicative of the identity of a remote end device with which the initiating end device is to communicate; updating the initiating end device table with the remote end device identifier and with the first session ID; returning a communication commencememnt request to the initiating end device; and transferring data as a plurality of packets each of which contains the first session ID to control routing of the said packets between the said initiating end device and the said remote end device via the local network access point.

Such a method of communication provides several advantages. Maintaining tables at the end devices and the network access points, with information being shared between a network access point and an end device connected to the network through it, makes efficient use of bandwidth resources across wireless networks whilst not affecting connection to "fixed" end devices across wired connections. Thus, a heterogeneous mix of end devices may be attached to the network efficiently.

The method is particularly useful also because it allows connection to and from devices whether or not they are Internet Protocol (IP) enabled. This is because the end device and network access point each maintain tables which can map an assignable IP address to a communication channel number between the network access point and the end device. If the end device is IP enabled, data may be sent as, for example, TCP/IP packets using the IP address of that end device, but if it is not, data may still be sent using the mapping between the communication channel number and the assigned IP address.

In a preferred embodiment, a telecommunications network further comprises a remote network access point to which the remote end device is connected, the remote network access point also having a plurality of assignable channels. The method may then further comprise: allocating a communications channel for the remote network access point to each of the end devices connected to the network via the said remote network access point; and maintaining, at the remote network access point, a remote network access point table which cross-references the channels allocated to these devices connected to the network via the said remote network access point with a corresponding end device identifier.

The method of preferred embodiments of the present invention permits communication between two end devices via first and second network access points. The method of connection between such network access points is usually a high or very high bandwidth wired connection and, in preferred embodiments, data may be transferred as IP datagrams between two network access points. Thus, the method of the present invention provides compatibility with the Internet and existing telecommunications networks hardware and data transfer protocols.

Preferably, the remote end device is Internet Protocol (IP) enabled, the local and remote access point tables being maintained with cross references for each allocated channel with a corresponding IP address assigned by the local and remote network access point tables respectively, and wherein the remote end device identifier is an IP address assigned by the said remote network access point, the method further comprising: forwarding data to be transferred from the initiating end device to the local network access point as a plurality of session packets each including the said first session ID; encapsulating, at the local network access point the data within each session packet into a transport layer packet such as TCP or UDP; inserting the first session ID into each said transport layer packet; encapsulating each transport layer packet into an Internet Protocol packet; and forwarding each IP packet to the said remote network access point for transmission to the said remote end device.

Where the end device is IP enabled, the various protocols of the TCP/IP suite may be employed to ensure reliable transport and congestion control. The method includes, preferably, the checking of tables at the network access points to see whether the destination end device is IP enabled and routing the data in accordance with that information.

Alternatively, the end device may be not IP enabled. The local and remote access point tables are, in that case, maintained with cross-references for each allocated channel with a corresponding IP address assigned by the local and remote network access point tables respectively. The remote end device identifier is preferably an IP address assigned by the remote network access point. In that case, the method may further comprise: searching the remote network access point table of the remote network access point upon receipt of an IP packet; and forwarding that IP packet to the remote end device as is, if the said searching step indicates that the IP address in the IP packet is not found in the list of IP addresses held by the said remote network access point table.

In that case, each packet may be transferred between the remote network access point and the initiating end device, via the first end device, as a session packet including the first session ID within a header portion of each session packet, and between the remote end device and the remote network access point as a session packet including the second session ID within the header portion thereof. The method then may further comprise: replacing, at the remote network access point, the first session ID in the session packets with the mapped second session ID when the session packets have arrived from the initiating end device.

Thus, the tables maintained at the network access points allow seamless connection between end devices across a distributed network; the initiating end device does not need to know directly the IP address assigned to the remote end device by the remote network access point, but only the IP address of the remote network access point itself. Routing of data is thus transparent to the end devices.

In particularly preferred embodiments, an application identifier is sent along with the session packets. This application identifier identifies an application to be employed by the remote end device. Preferably, the method then further comprises ascertaining, at the remote network access point and on the basis of the received application identifier, whether the remote end device is capable of accepting the request to employ the said application; and forwarding data from the initiating device for use by the said application in the event that the remote end device is capable of accepting the request.

The remote end device may be prevented from accepting the request for a number of reasons. Firstly, the remote end device may only permit a single session to be active at a given time. Alternatively, it may support multiple sections but all of these may already be in use. Thirdly, it may be that the end device is not able to support such an application. For example, where the end device is a mobile or cellular telephone, it may not be able to accept streaming video.

Well known port numbers may be used to identify end device applications. As will be understood by those skilled in the art, certain port numbers are reserved for well known services, and Request For Comments (RFC 1060 describes the service names and their assigned or well known port numbers along with the relevant protocol. For example, File Transfer Protocol (FTP) is assigned port numbers 20 and 21 in RFC 1060.

Where the remote end device is IP enabled, it is not necessary for that remote end device to know about session IDS. Any session IDS are stored at the remote network access point in the remote network access point table. Thus, in that case, it is preferable that the remote network access point sends a request back to the initiating end device to start data transfer. If the remote end device is, by contrast, not IP enabled, then data routing uses session IDS and it is in that case preferable that the remote end device instead initiates data transfer by returning a commencement request itself, via the remote network access point and, where applicable, the local network access point, to the initiating end device.

In another particularly preferred feature of the present invention, it is possible to change the connection point of the remote end device from a first remote network access point to a second, different remote network access point. In that case, the method may further comprise: allocating a new remote communications channel for communication between the remote end device and the second remote network access point, the new remote communications channel having an associated new remote communications channel identifier; forwarding the new remote communications channel identifier from the second remote network access point to the first remote network access point; returning, from the first remote network access point to the second remote network access point, the contents of the first remote network access point table, the new remote communications channel identifier being employed as a routing controller; replacing the old remote communications channel identifier, received from the first remote network access point table, with the new remote communications channel identifier; adding the contents of the first remote network access point, including the new remote communications channel identifier, to the second remote network access point table; and transferring data between the initiating and remote end devices via the local network access point and the second remote network access point.

Such an approach permits seamless roaming of end devices where, for example, the device is a mobile or cellular telephone, or a moving laptop/PDA. Importantly, the end devices are unaware of any IP address changes invoked when they move.

Furthermore, it is possible for an ongoing session between a first and a second end device to be transferred seamlessly. Specifically, data being sent from a first, local or initiating end device to a first, remote end device may be transferred so that the data instead is sent to a second remote end device. This may be desirable where a more suitable remote end device becomes available. For example, a user of the first remote end device may arrive at an office which has a personal computer with a fixed access to the Internet. If, on arrival, the user is currently undertaking a video conference with the local or initiating end device, it is clearly desirable that this communication continue via the personal computer because of its (usually) higher bandwidth access to the Internet. The method of preferred embodiments of the present invention provides for seamless handover between the two remote end devices without a break in the session.

In still a further preferred feature of the present invention, the session packets which are transferred are modified so as to include an indication of the type of data being transferred. This is particularly useful with mixed media devices which include, for example, separate video processing, audio processing, and other application processing devices. By identifying the type of data being transferred, such a mixed media end device can automatically determine how best to handle and display/output the received data.

According to a second aspect of the present invention, there is provided a database for a network access point in a telecommunications network, comprising: (a) a cross-reference between (i) one of a plurality of communications channels assigned for communication between the network access point and an end device, and (ii) a corresponding device identifier for that end device to which that communications channel is assigned; (b) a first session identifier (session ID) received from a initiating end device and selected from one of a plurality of session IDS held by that end device; and (c) a remote end device identifier indicative of the destination of data to be sent from the initiating end device; the database being configured to permit routing of data packets containing the first session ID between the initiating and the remote end devices, via the network access point.

The invention also extends to a local network access point for a telecommunications network, the local network access point comprising: a plurality of communications channels at least some of which are assigned for communication with a corresponding plurality of end devices; and a database under the control of the local network access point, the data base including: (a) a cross-reference between the assigned communication channels and an identification of an end device to which that channel is allocated; (b) a first session identifier (session ID) forwarded from an initiating end device and selected from one of a plurality of session IDS held by that end device; and (c) a remote end device identifier indicative of the destination of data to be sent from the initiating end device the local network access point being arranged to route packets of data, each containing the said session ID, in accordance with the contents of the said database.

Further aspects of the invention relate to a telecommunications network comprising first and second network access points operable in accordance with the method described above, and also such a network to which end devices are attached.

BRIEF DESCRIPTION OF THE DRAWINGS

The invention may be put into practice in a number of ways, one of which will now be described by way of example only and with reference to the accompanying drawings, in which:

FIG. 2 shows an information table for an end device connected to the network of FIG. 1, containing information in accordance with an aspect of the present invention;

FIG. 3 shows an information table for a base station within the network of FIG. 1, containing information also in accordance with an aspect of the present invention;

FIG. 13 shows a modified end device information table for use with a mixed media device; and FIG. 14 shows a modified base station information table for use with a mixed media device.

DETAILED DESCRIPTION OF EXEMPLARY EMBODIMENTS

Figure 1:
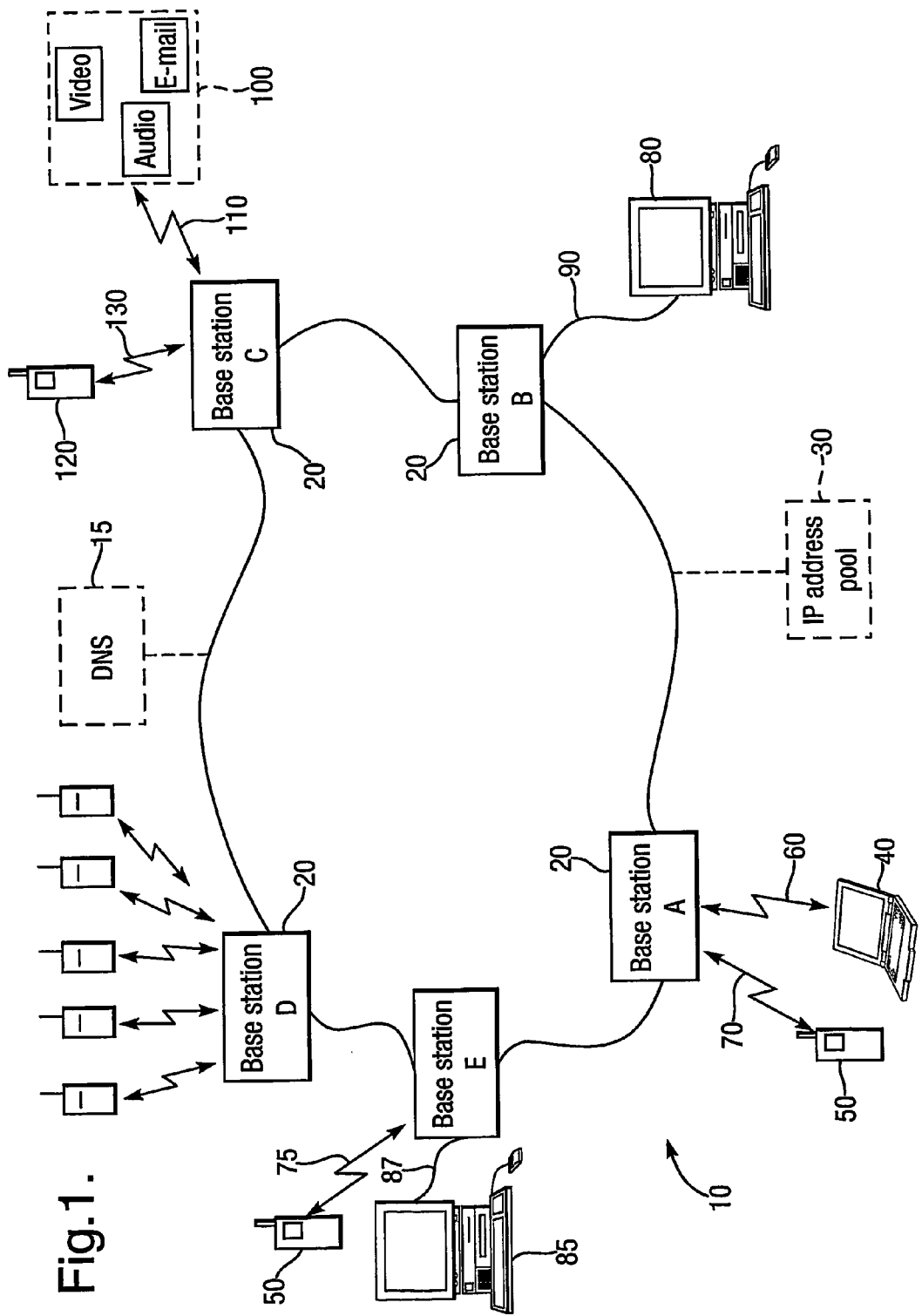
FIG. 1 shows an exemplary telecommunications network comprising a plurality of network access points or base stations, and a plurality of end devices connectable to one another via the base stations.

Turning first to FIG. 1, a simplified schematic representation of a telecommunications network 10 is shown. The network comprises a plurality of fixed access points or base stations 20 which are interconnected. Attached to each base station 20 are one or more end devices. For example, a laptop computer 40 and a mobile telephone 50 are connected via wireless communication channels 60, 70 respectively to base station A. A fixed computer such as a personal computer 80 is attached via a fixed (wired) connection 90 to base station B, a mixed media device 100, which will be explained in further detail below, is connected via a wireless link 110 to base station C, and another mobile telephone 120 is likewise connected to the base station C via wireless communication link 130.

The network 10 also comprises a central database comprising a pool of assignable Internet Protocol (IP) addresses. The purpose of this central IP address pool will be explained in connection with FIG. 4 below.

The following description will explain the initial set-up of a new base station when it is configured into the network 10, the manner in which end devices establish communication between each other, and the communication process once the connection has been established. Roaming of end devices and transfer of sessions between end devices will also be explained. The specific description is set within the context of two mobile end devices establishing communication over a fixed IP network, therefore. It is to be understood, however, that the nature of the end device (mobile or fixed) is not important; indeed, a desirable feature of the present invention is that it allows communication between a heterogeneous mix of end devices. Furthermore, although from here onwards, the peripheral access nodes are referred to as base stations 20, it is to be understood that these can be wireless base stations, fixed access points, or devices that provide both capabilities. Thus, references to base stations are intended to encompass what is, effectively, a seamless access device.

Each of end devices attached to the network 10 stores or has access to an information structure termed an end device information table. An example of this information table is shown in FIG. 2. The end device information table contains three main categories. The first information category stores an identifier for a channel of communication between an end device and its local base station. This is allocated by the base station upon connection to it, and this will be explained further in connection with FIG. 4.

The second category of information is termed the device profile category and this contains a number of device-specific entries. These entries indicate the name(s) that the device uses, the well known port numbers that it can support, whether or not it is IP enabled, and how many remotely originated sessions it can, or is prepared to, simultaneously support.

The final information category maintained within the end device information table is termed "session information". This contains an updatable list of session identifiers for a session in which that end device is involved. These session identifiers, labelled Session_IDorig, are linked to the memory location of the application associated with that session ID. The second piece of information stored within the session information section of the end device information table lists a list of available (that is, assignable) local IDS for locally-originated sessions. This list indicates the availability of session IDs controlled by the end device. The number of entries in this last sub-category defines the maximum number of locally-originated sessions that can be supported simultaneously.

FIG. 3 shows an information table similar to the one shown in FIG. 2, but this time maintained by the various base stations 20. The base station information table contains two separate sections, "sending" and "receiving". These separate sections deal with data passing, for example, from the local or initiating end device, through its associated base station, and onwards to another base station for eventual transmission to a remote end device, and for dealing with data passing in the other direction, that is, received at the base station from a remote base station or a remote end device for forwarding back to the local or initiating end device. The contents of the base station information table will be explained further below.

Figure 4:
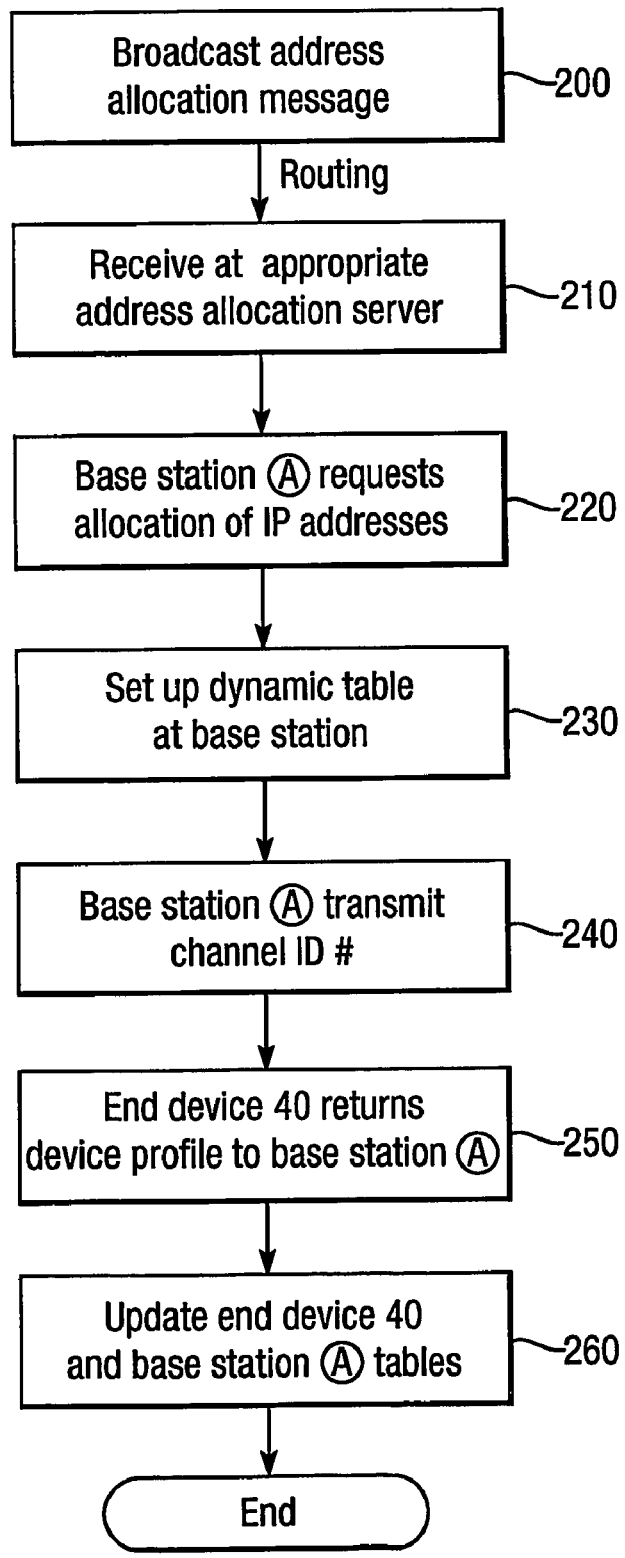
FIG. 4 shows a flow diagram for initial set-up of a base station when it is added to the network of FIG. 1.

Turning now to FIG. 4, an explanation of the initial set-up of a base station when it is first added to the network will be explained. In the present example, referring to FIG. 1, it is assumed that the network initially contains only base stations B, C, D and E, and that base station A is to be added in for the first time.

At step 200, the base station A first sends a pre-defined address allocation message which is recognized by the network 10 and routed to an appropriate address allocation server which maintains the IP address pool 30. Reception at the appropriate IP address allocation servers is shown at step 210 in FIG. 4.

Next, once communication has been established, the base station A requests the number of IP addresses that it needs to be able to allocate on the basis that it requires one IP address for each of its communication channels. This is shown at step 220. Although this process potentially involves allocating a large number of addresses (there are typically a very large number of communication channels available for any base station), it is a relatively static process once the initial set-up phase has been completed. This is because address updates are needed only when fixed network equipment is added to or removed from the network, and/or if address re-allocation is ever needed for operational reasons. If a base station is removed from the network, it returns its allocated IP addresses to the address allocation server for re-allocation elsewhere.

The relationships between the allocated IP addresses and the physical-layer communication channels are stored in the sending and receiving portions of the base station information table shown in FIG. 3. This is shown at step 230 in FIG. 4. As seen in FIG. 3, both the sending and receiving portions of the base station information table includes an entry, respectively, for every IP address and communication channel controlled by base station A. Each of these entries in turn also has more detailed information associated with them. For the sending portion of the base station information table, this more detailed information is arranged within two categories called locally-originated sessions, and remotely-originated sessions. The locally-originated sessions category contains the relationships that locally-allocated session IDs have with remote IP addresses and well-known port numbers. The remotely-originated sessions category contains the relationships that locally-allocated sessions IDS have with remote IP addresses, remotely-allocated session IDs, and well-known port numbers. Both the locally-originated sessions and remotely-originated sessions categories also contain indications as to whether or not the remote end device or devices which are to be connected to are IP enabled. For the receiving portion of the base station information table, a similar collection of entries is also maintained. However, an additional category entitled "End Device Information" is also maintained in the receiving portion of the base station information table. The locally-originated sessions category of the receiving portion of the base station information table contains the relationships that locally-allocated session IDs have with well-known port numbers. The remotely-originated sessions category of the receiving portion of the base station information table contains the relationships that remote IP addresses and remotely-allocated sessions IDS have with locally-allocated session IDs and well-known port numbers. The end device information category contains two sub-categories called "General Information" and "Local IDs for Remotely-Originated Sessions". The "General Information" sub-category indicates which well-known port numbers are supported by the end device, and defines the maximum number of remotely-originated sessions which the end device is able and/or prepared to support. The "Local IDs for Remotely-Originated Sessions" sub-category of the end device information in the receiving portion of the base station information table indicates the availability status of the session IDs that have been allocated for use by remotely-originated sessions. The actual number of IDs available is determined by the second entry under the "General Information" heading.

Although the base station information table contains several references to well-known port numbers, these entries are not strictly necessary. They do, however, enable compatibility to be achieved with conventional IP networks.

Maintaining a base station information table as shown in FIG. 3 at the base station, and a separate end device information table at end devices, provides a bandwidth efficient solution. Thus, whilst it is to be understood that the base station information table could be installed on an end device instead, this would offset this bandwidth efficient solution.

Returning now to FIG. 4, once the base station information table has been set up at base station A (step 230), it is next necessary to establish connectivity between an end device and the base station. In the present example, it is assumed that mobile device 50 is to connect to the base station A.

The signalling channel in the wireless link 70 which is to connect the mobile 50 to the base station A is used to establish such connectivity. Once physical connectivity has been established, the mobile device 50 and the base station A exchange information. As seen in FIG. 4, at step 240, the base station A transmits to the mobile device 50 the channel ID which it has allocated to that mobile device 50. At step 250, the mobile device 50 in turn sends its device profile back to the base station A. The information exchanged is stored within appropriate categories of the base station and end device information tables which are set out in FIGS. 2 and 3.

It is to be understood that, eventually, the end device profile information could be obtained automatically from, for example, a central device/user profile storage device within the network 10. This would minimize the amount of information that is exchanged between the mobile device 50 and its base station A. It is likewise to be understood that an identical procedure can be employed when a fixed device such as the personal computer 80 attaches to the network 10 (in that case via base station B).

When an end device detaches from the network, the process described above is simply reversed.

The foregoing description of activation of the mobile device 50 is preferred since it uses the available access bandwidth across the connection 70 most efficiently. However, it is to be understood that the base station A could simply inform the mobile device 50 of the IP address it is to use. The mobile device 50 could then use this IP address in the conventional way which would enable communication using conventional IP networking methods.

The initial set-up also preferably includes appropriate security checks. These do not form a part of the present invention and will not be described further, therefore.

Figure 5:
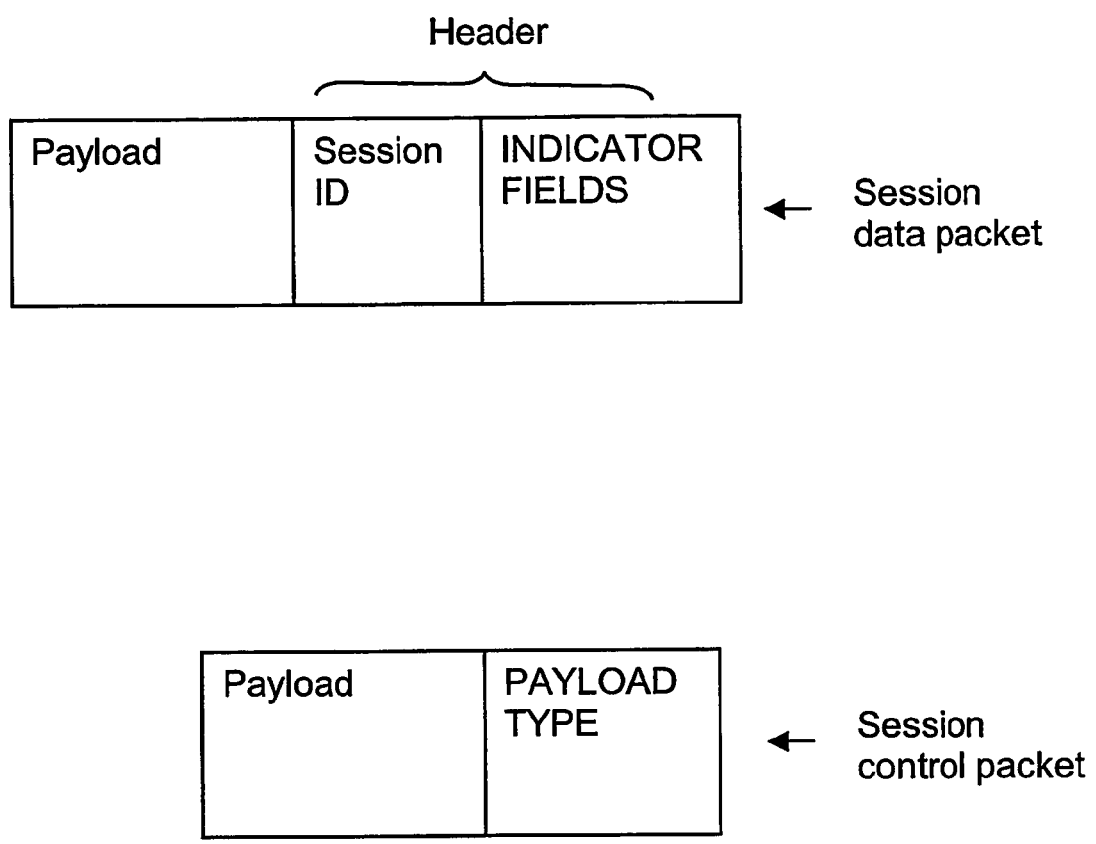
FIG. 5 shows the format of a session data packet and an associated session control packet, each of which are in accordance withe the present invention.

Before describing the establishment of a connection between two end devices, the form of the type of data packet which is used in accordance with an embodiment of the present invention, will first be described with reference to FIG. 5. The packet is hereinafter termed a "session packet" and takes two forms, a session data packet (for transmission of data such as text or images) between the end devices, and an associated session control packet used particularly in the establishment of a connection as described in the flow charts of FIGS. 6 to 8.

The session data packet has a header portion which contains two fields, one for carrying a session ID, and one for carrying two indicator fields. These indicator fields are used to indicate which IP address in the IP header the session ID is associated with, and whether the session data packet payload is application or control data. The former is preferred but not essential; it is included for the sake of completeness since, in future, network node requirements may require the IP address-session ID pair to be used. Furthermore, it is to be noted that the use of other general-purpose header fields is not precluded and this may become necessary for a variety of other reasons such as packet length etc.

In order to limit the amount of control signalling necessary, all session IDs ending with a binary zero are reserved for use by locally-originated sessions, and those ending with a binary 1 are reserved for use by remotely-originated sessions. These are the categories in the tables of FIGS. 2 and 3 referred to as Session_IDorig, and session_IDrec. One session ID, for example "0000" is reserved for use by session packets that carry general purpose control instructions.

The payload type field simply indicates whether the session packet payload is application data or control information. The session control packet header indicates which particular control function is being carried. A session control packet is always encapsulated within a session data packet, and the session data packet is encapsulated as appropriate for the underlying network protocol being used (for example, an IP datagram). For the case of IP networking, it is assumed that a pre-allocated and unique protocol indicator exists for identifying that an IP datagram is carrying a session packet. In addition, when a base station detects this particular indicator in an IP datagram header, it always extracts the session packet.

Figure 6:
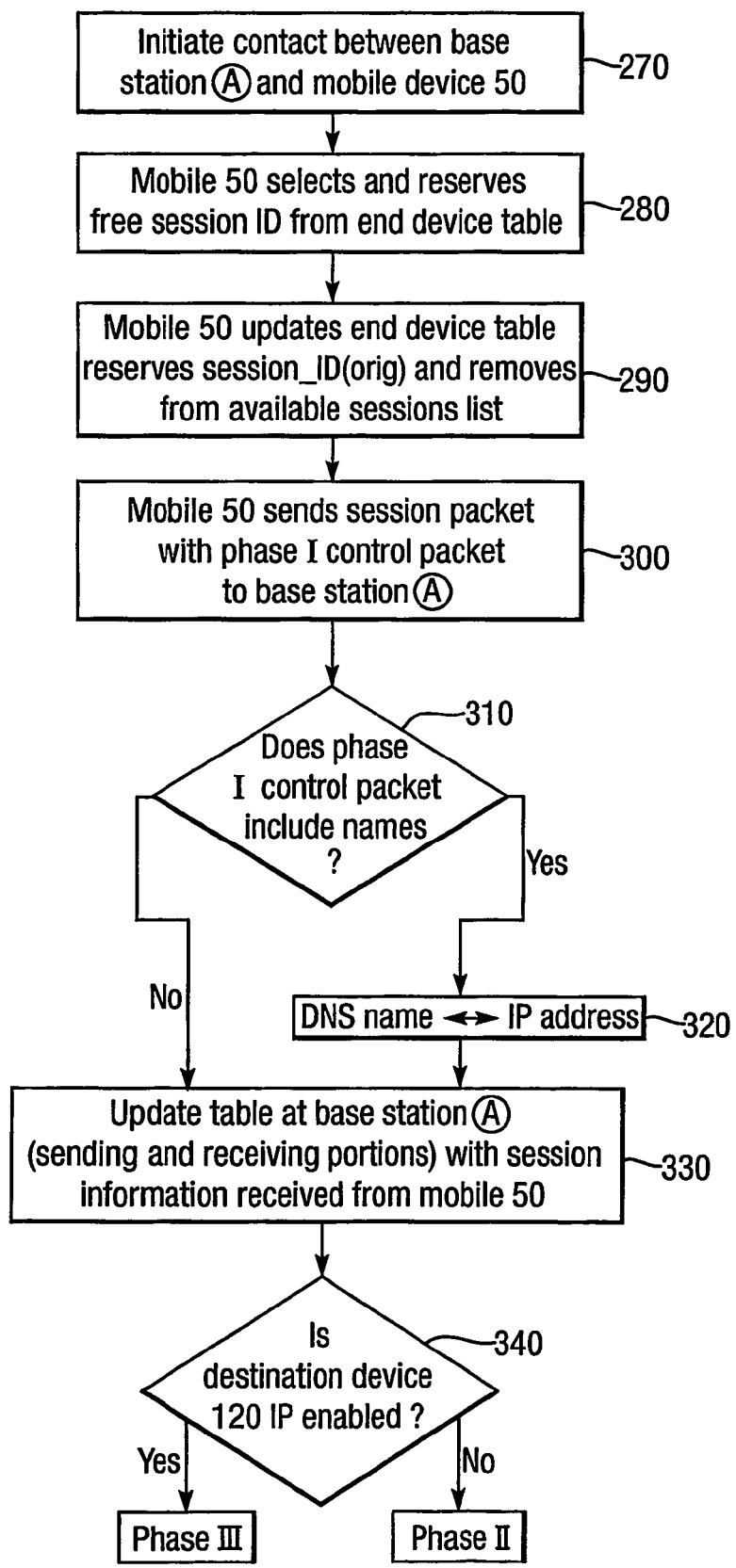
FIG. 6 shows a flow diagram for the first phase of the establishment of a connection between an initiating and a remote end device of the network of FIG. 1, via a base station or base stations of that network.

Turning now to FIG. 6, a flow diagram for the first phase of the establishment of a connection between an initiating and a remote end device of the network of FIG. 1, via one or more base stations of that network, is shown. In the specific embodiment of FIG. 6, it is assumed that a connection is to be made between the mobile device 50, connected to the base station A, and the mobile device 120 which is connected to the base station C.

In the first phase of the connection, the mobile device 50 wishing to establish communication with the mobile device 120 begins by selecting and reserving an unused ID from the session information category in the end device information table of the mobile device 50. This is shown at steps 270 and 280.

Next, the mobile device 50 creates a new entry in the active sessions sub-category (FIG. 2). The available sessions list is updated in consequence so that the allocated session ID cannot be re-allocated until it is no longer in use.

Next, the mobile device 50 sends a session packet, containing an established phase I control packet to the base station A (step 300). The phase I control packet contains the well-known port number for the service being requested at the mobile device 120, and either the name of the remote end device or its IP address. Furthermore, the phase I control packet contains information identifying whether or not the mobile device 120 is IP enabled. At step 310, the base station A determines whether the phase I control packet contains a name. If it does, then this name is sent to a Domain Naming Service (DNS) 15 (FIG. 1). This resolves the name into an address. Specifically, the DNS 15 returns the IP address for the remote mobile device 120, plus an indication of whether or not that remote mobile device 120 is an IP enabled device. If this information is already present in the phase I control packet, then this domain name resolution step is omitted.

Once these steps have been undertaken, the base station A then has sufficient information to populate the base station information table, and more specifically, to create the new session entry needed in the locally-originated sessions category in both the sending and receiving portions of the base station information table. The former is inserted under the appropriate channel ID, and the latter under the appropriate local IP address (see FIG. 3).

Figure 7:
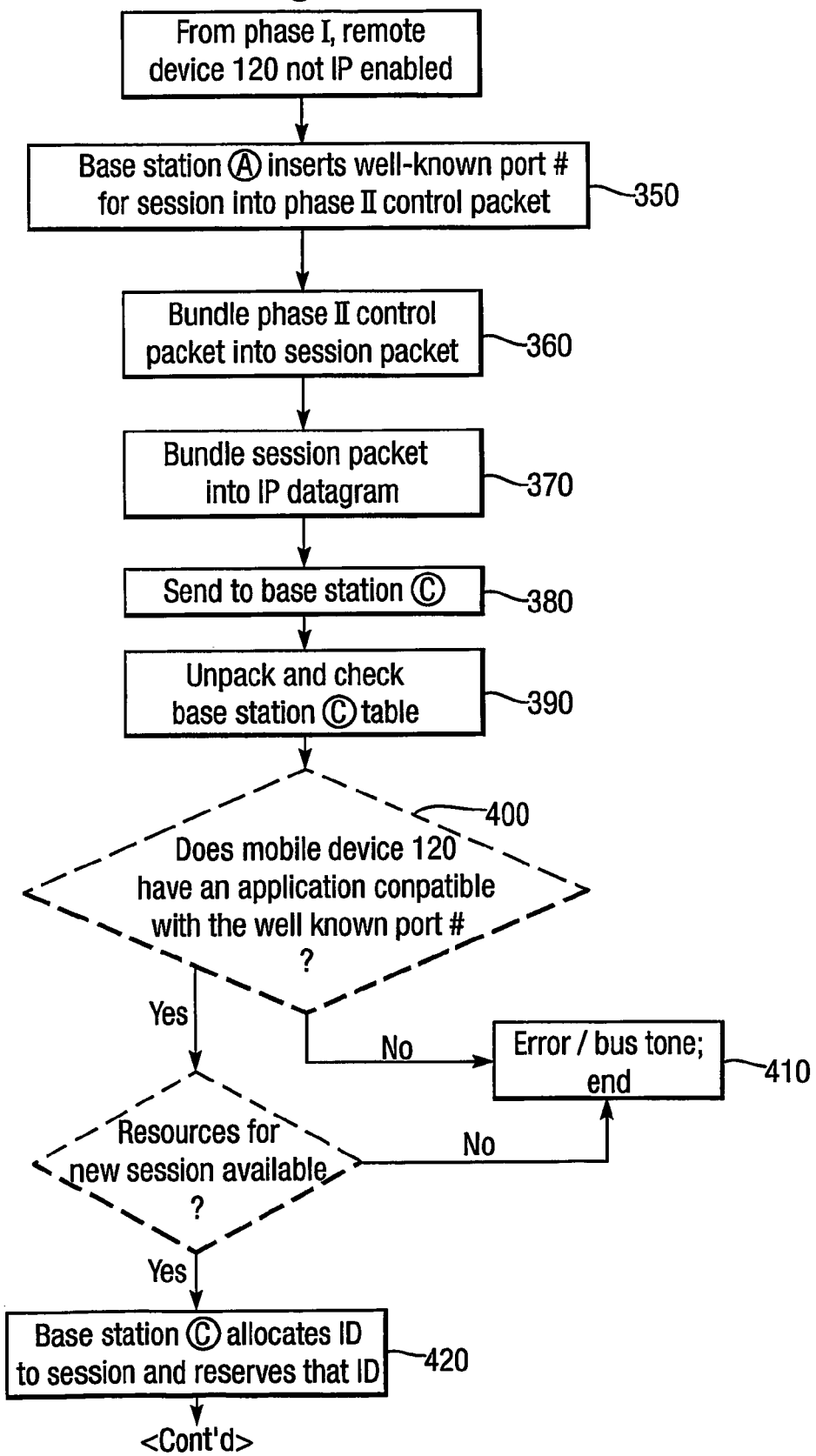
FIG. 7 shows a flow diagram for the second phase of such a connection establishment.
Figure 7:
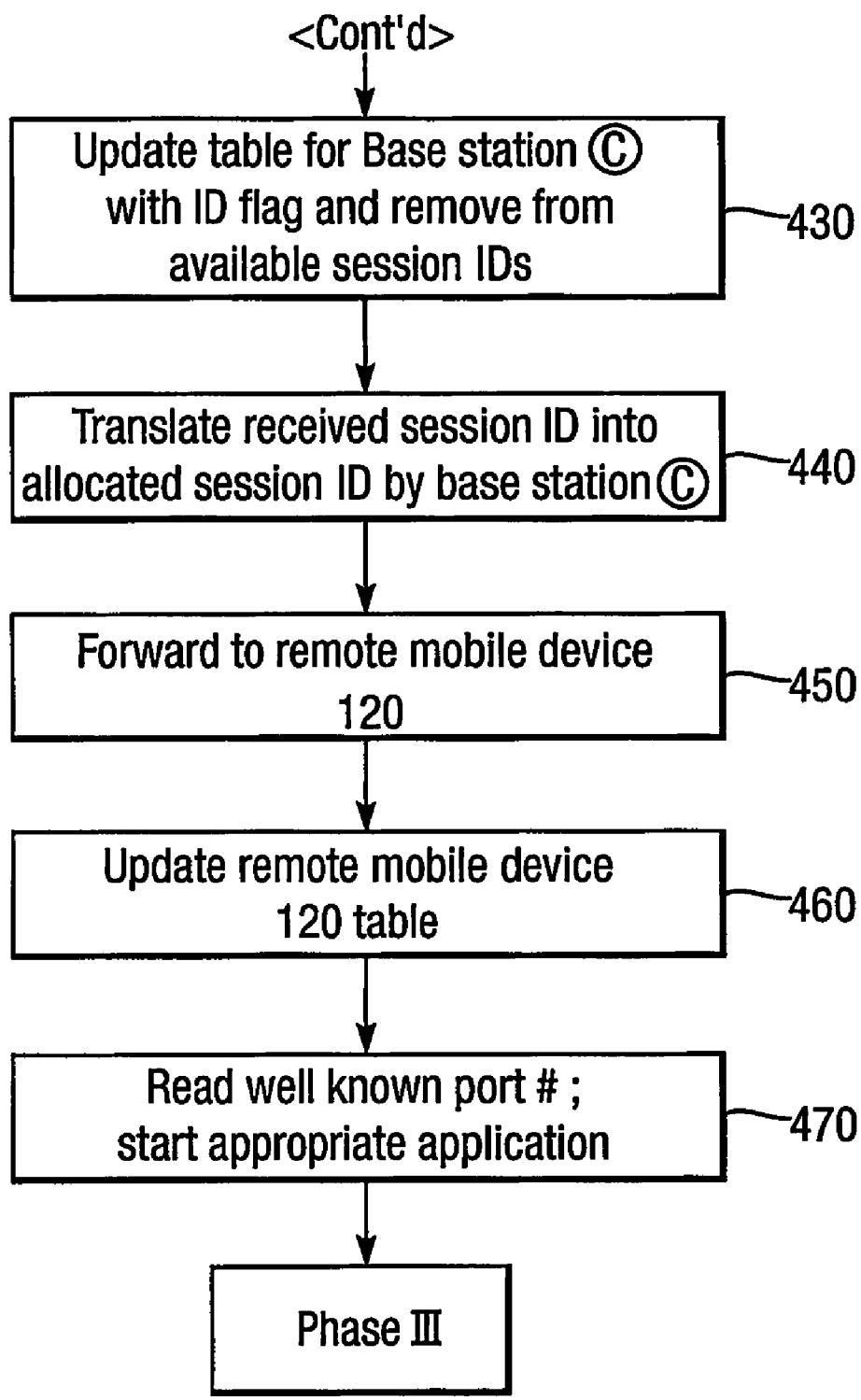

The base station A also now knows whether or not the remote mobile device 120 is IP enabled. FIG. 7 shows phase II of the connection establishment procedure, which is used only when the remote mobile device 120 is not IP enabled. When phase II is invoked, the base station A inserts the well-known port number associated with the new session into an established phase II control packet at step 350. The phase II control packet is then encapsulated into a session packet at step 360 and this in turn is bundled into an IP datagram at step 370. The information needed for the encapsulation process is obtained from the locally-originated sessions category within the sending portion of the information table held by the base station A. In addition, the session ID association field in the session packet header is set to the appropriate state.

At step 380, the IP datagram is sent to the base station C. Because the data is sent as an IP datagram, intermediate nodes such as base station B or base stations D and E in FIG. 1 will handle it as they would any other IP datagram, that is, they will route it as appropriate to base station C in accordance with the source and destination addresses in the header to the IP datagram.

Once the IP datagram has been sent to the base station C at step 380, it is received at that base station C and unpacked. The phase II control packet obtained when the IP datagram is unpacked trigger the base station C, check its end device information entries in its base station information table to ascertain whether the remote mobile device 120 has an application which is compatible with the well-known port number set out in the received phase II control packet. This checking is carried out at step 400.

If the remote mobile device 120 does not have a suitably compatible application, then an error condition exists. This may be dealt with in a number of ways, such as, for example, routing an error back to the initiating mobile device 50 across the network, with an explanation of the problem, or, perhaps, causing the initiating mobile device 50 to generate a busy tone. This is shown at step 410 in FIG. 7.

If there is a compatible application executable upon the remote mobile device 120, it is also necessary to ascertain whether the remote mobile device 120 has sufficient resources to run a new session. For example, the remote mobile device 120 only supports a single session and this is already in use, or if the mobile device 120 supports multiple sessions each of which is currently in use, then again an error state exists and the initiating mobile device 50 is so informed at step 410 again.

Provided that there is a suitable application and sufficient resources, then the base station C reserves one of the unused session IDs from its locally-held list of available session IDs. The reserved session ID is allocated to the new session. This is shown at step 420.

The base station C now creates an entry in the remotely-originated sessions category in the receiving portion of its base station information table. It then replaces session ID that arrived within the session packet header from base station A, with the new locally-allocated session ID (step 440). At step 450, a packet including this translated session ID is forwarded to the remote mobile device 120.

The remote mobile device 120, upon receipt of this packet, creates a new session entry in the active sessions sub-category of its end device information table (step 460). The remote mobile device 120 then uses the well-known port information, at step 470, to identify which network application is needed. The appropriate application is then started.

Figure 8:
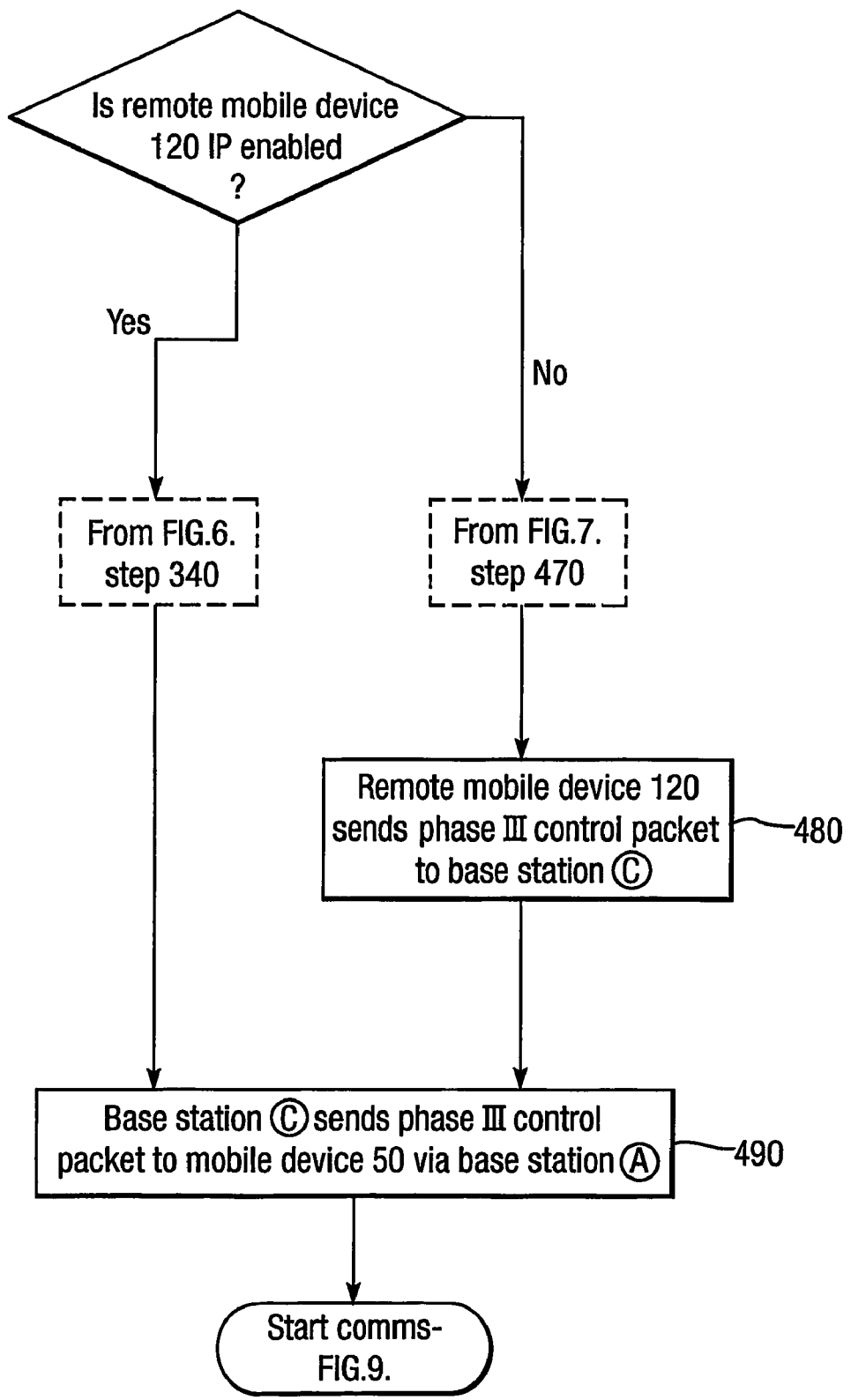
FIG. 8 shows a flow diagram for the third phase of such a connection establishment.

Once this procedure has completed, the process moves onto the final, third phase of the connection establishment, which is shown in FIG. 8.

Where the remote mobile device 120 is not IP enabled, the remote mobile device 120 sends a phase III control packet back to the base station C (step 480). When the remote mobile device 120 is IP enabled, by contrast, the base station C generates the phase III control packet itself. In either case, once the phase III control packet has been generated, it is sent across the network 10 back to the base station A where it is forwarded to the mobile device 50. Receipt of the phase III control packet triggers the initiating mobile device 50 to start data transfer. The reason that base station C handles the "session" aspects during phase III when the remote mobile device 120 is IP enabled is that the remote mobile device 120 then knows nothing about session IDs. If the remote mobile device 120 is not IP enabled, however, then it does know about session IDs and so it can create the phase III control packet itself.

If the final phase of the established communication procedure should fail for any reason, the appropriate process is needed for removing and/or updating the necessary entries within the various information tables (end device and base station) are invoked.

It will be understood that, where the mobile device is using data communication, it is not precluded from running a control protocol that provides reliable transport and/or flow control. When using such a control protocol, the end device would encapsulate the application data within the control protocol packet, and then encapsulate this within a session packet. In other words, the transport and/or flow control is simply another layer within the stack of protocols. The remote mobile device 120 is the only point at which this control protocol is processed.

Furthermore, it is to be noted that there may be certain efficiency advantages to be gained from integrating the established connection process (FIGS. 6, 7 and 8) with other, higher layer control processes such as TCP's three-way handshakes, resource reservation and so forth. However, this does not change the fundamental principles of the processes involved, just their overall efficiency. In addition, it is conceivable that the established connection phase could eventually become an integral part of future, novel name resolution methods if these eventually become better integrated with network routing methods than is usually the case. In addition, it would also become possible to reduce the IP datagram header size, by only having a destination address field. However, this would require appropriate session control packets to be defined carrying the source IP address information needed when establishing communication, and use of such an approach would probably make it incompatible with legacy systems.

Figure 9:
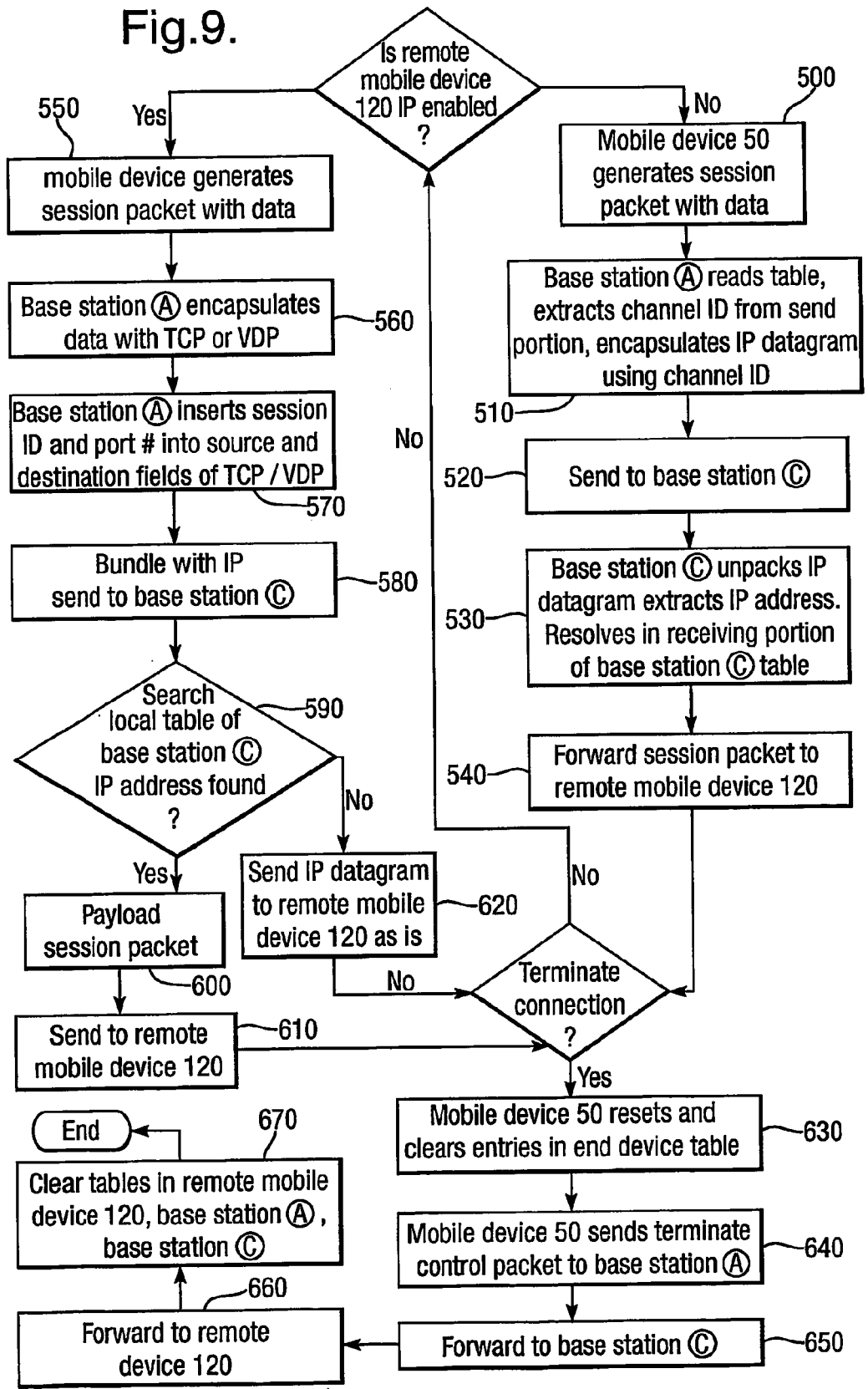
FIG. 9 shows a flow diagram for communication of data between end devices following the establishment of a connection.

FIG. 9 shows a flow chart of the steps in the communication of data between end devices, following establishment of a connection in accordance with FIGS. 6 to 8.

Where the remote mobile device 120 is not IP enabled, communication between the mobile devices 50 and 120 proceeds as follows. FIG. 9 describes the process for transfer data from the mobile device 50 to the mobile device 120 but the procedure is symmetrical for transfer of data in the opposite direction.

Firstly, the mobile device 50 generates a session packet with an application payload (step 500). This session packet is forwarded the base station A where it is encapsulated in an IP datagram. The information needed for this encapsulation process is obtained from the appropriate channel ID entry within the sending portion of its information table. This is shown at step 510. This IP datagram is forwarded to base station C at step 520, and base station C unpacks the IP datagram and extracts the IP address. This extracted IP address is resolved in the receiving portion of the information table of base station C, as explained at step 530 in FIG. 9. The extracted session packet is then forwarded to the remote mobile device 120, at step 540.

If, by contrast, the remote mobile device 120 is IP enabled, then at step 550 the mobile device 50 once again generates a session packet including an application payload. This application payload session packet is forwarded to base station A where it is encapsulated using either a UDP or TCP packet as appropriate. This is shown at step 560. In encapsulation of the payload in the session packet within a UDP or TCP packet, the session ID is inserted along with the well known port number values, respectively, into the source and destination port fields in the UDP/TCP header. The UDP or TCP packet is then encapsulated within an IP packet (step 580) using the information from the appropriate channel ID entry within the sending portion of the information table associated with base station A. The IP datagram thus generated is forwarded to base station C.

When base station C receives an IP datagram containing either a UDP or TCP packet, it searches the local IP address entries stored within the receiving portion of the information table associated with base station C, to try and find the destination address carried in the IP header. If the IP address is found, the associated information is employed to transfer the IP datagram payload into an appropriate session packet as shown at step 600. This session packet is forwarded to the remote mobile device 120 at step 610. If, at step 590, a search of the local table of base station C ascertains that the IP address is not found, then, at step 620, the IP datagram received is forwarded to the remote mobile device 120 unchanged, that is, still as an IP datagram.

Once a session is no longer needed (which does not have to correspond with data transfer completing), the end device re-sets and removes the entries in its end device table. Again for the purposes of explanation, in FIG. 9 the mobile device 50 is shown, at step 630, re-setting and clearing entries in its end device table. At step 640, the mobile device 50 sends a terminate control packet to the base station A, which is forwarded onto base station C at step 650. At step 660, the remote mobile device 120 receives the terminate control packet. Each of the nodes within the data transmission/reception connection then clear their tables at least in respect of the data pertaining to the terminated session.

Figure 10:
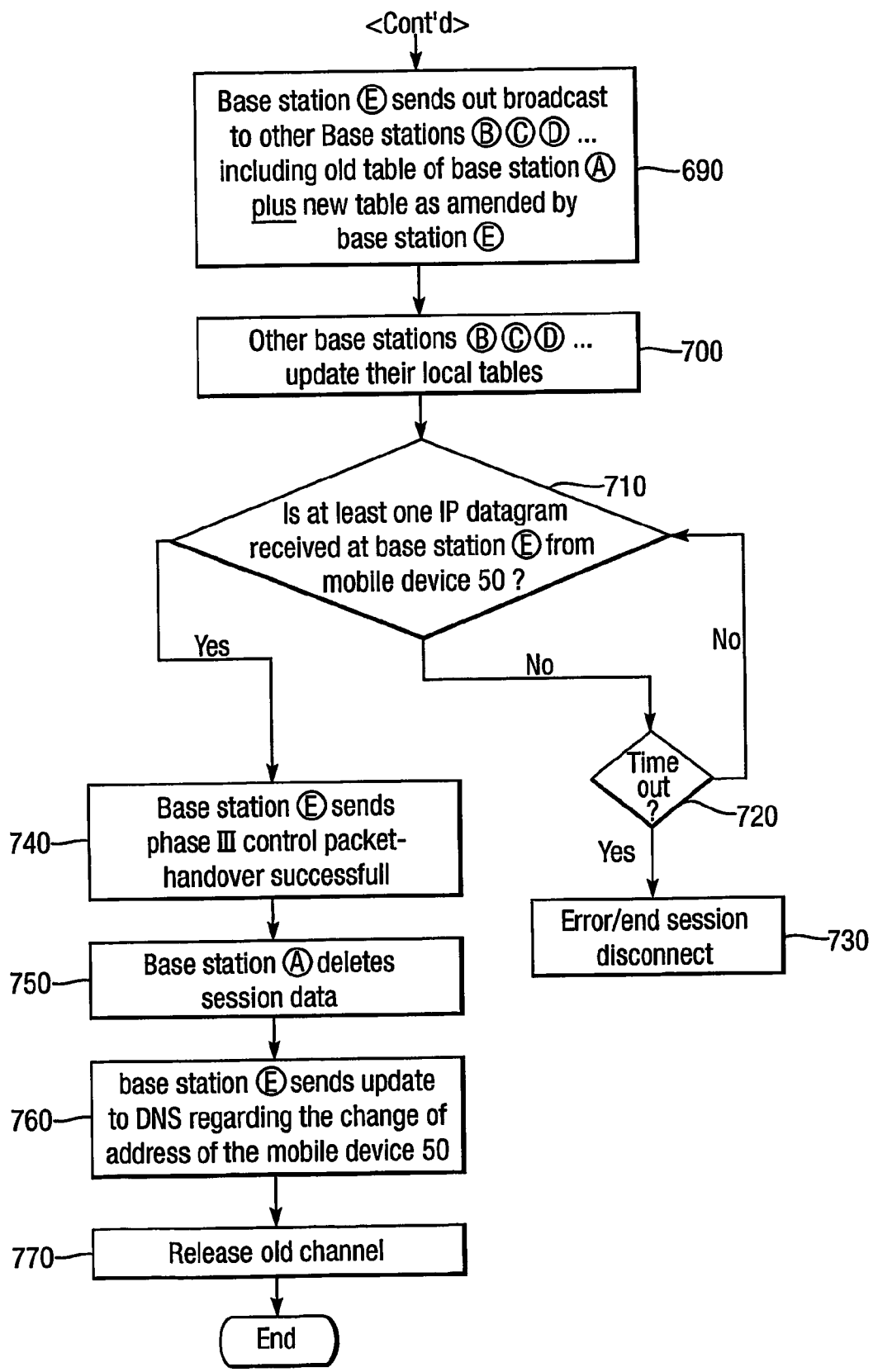
FIG. 10 shows a flow diagram of the seamless movement of connection of an end device from a first to a second base station whilst a session is taking place.

An important preferred feature of the invention is the manner in which it allows seamless roaming of end devices. For example, when the mobile device 50 moves outside the range of base station A, it becomes preferable that it is instead connected via a different base station for a different "cell". In the present example, the invention is described in its preferred embodiment where the mobile device 50 moves from a connection to base station A, into a connection to the network 10 via base station E. When the mobile device 50 begins to move outside the range of wireless connection to base station A, this is detected by the underlying wireless interface which then manages the physical layer handover to base station E. This procedure is well known in the art and will not be described further. Detection is shown at step 600 in FIG. 10. In addition to handover of the physical layer communication, it is however also necessary for the communication sessions associated with the moving mobile device 50 to be handed over as well. The procedure for doing this is shown in the remainder of FIG. 10. At step 610, the underlying wireless network invokes the handover process. Base station E to which the mobile device 50 is to connect first of all allocates a free communications channel to that mobile device 50, at step 620. Next, at step 630, base station E updates its information table as previously. At step 640, base station E then sends a phase I control packet, encapsulated within a general purpose session packet, to base station A via the moving mobile device 50. The mobile device 50 simply acts as a relay point, as seen at steps 650 and 660. The handover control packet contains the IP address of the new communication channel. When the base station receives this control packet, it collects all of the relevant entries from its session information table and forwards them to the new IP address in a handover phase II control packet (step 670). Base station E then inserts these entries into its own session information table, after having replaced all references to the original channel ID/IP address with the new values it allocated, see step 680.

Base station E then sends out a change of address control message in a general purpose session packet. This is broadcast to all of the remote base stations in communication with the moving mobile device 50. This is shown at step 690. Generally, this control packet contains both the original IP address and session ID and their replacement values. At this point, it should be noted that the session ID only needs to be contained within the control packet when, as in the present example, the mobile device is the one that originated the session. If, by contrast, the remote mobile device 120 had been moving, the session ID would not have been needed within the control packet.

At step 700, the various base stations then use these new, received values to replace all references to the original IP address and session ID in their information table.

At step 710, the base station E listens to determine whether at least one IP datagram has been received from the mobile device 50. If, after a predetermined time-out period, for example, no IP datagram is received at the base station E from the mobile device 50, then appropriate error messages may be automatically generated and/or the session may be terminated (step 730). Once at least one IP datagram has been received at base station E from the mobile device 50, the base station E sends a phase III control packet in a general purpose session packet, at step 740. This phase III control packet informs the base station A that session handover has completed and that it can now remove the appropriate entries from its information table. At step 750, base station A does this. As an alternative to sending a phase III control packet, the base station A may automatically delete its session data after a predetermined time out.

At the same time as sending the replacement IP address information to the remote base stations, the new base station E also sends an update message to the name resolution system (DNS 15 in FIG. 1) informing the DNS 15 of the change of address of the mobile device 50, see step 760. Finally, at step 770, the underlying protocol is instructed to release the old communication channel. The procedure for handover is the complete.

An analogous procedure may be employed when it is desirable to switch a session from a first to a second end device. For example, it may be desirable, where a video stream is being sent to the mobile end device 50, to transfer it instead to a fixed end device 85 (see FIG. 1). The connection 87 between the fixed end device 85 and the base station E is likewise fixed in this example and thus typically has a significantly higher bandwidth than the wireless connection between the mobile device 50 and base station E. Once again, it is assumed that some form of local network device discovery procedure exists within the network 10, and that this has been pre-programmed to provide the address(es) of suitable new devices as they become available.

One exemplary way of achieving this is as follows. The geographical location of the mobile device 50 may be monitored as it roams within a cell defined around the base station E. This is shown at step 800 in FIG. 11. The network 10 includes a network device profile database which describes the profile of different devices within the cell and, specifically, their capability, along with an identification of their geographical location.

A user profile may then be built up. For example, a user may determine that it is desirable, wherever possible, to view video streams from a fixed device across a wire link to the Internet. Even within this, the user may stipulate that most preferred is a T1 connection to the Internet, with very high bandwidth, and after that, an ISDN connection, and least preferred of the fixed connections is a dial-up (modem) connection.

On the basis of this profile, the system may determine automatically, on the basis of this user profile, when it is desirable to switch a session. So, for example, by using GPS location of the mobile device 50, when that device moves within a predetermined geographical range of the fixed device 85 (typically, the geographical range being such that the user can readily see both devices), the session may be switched onto the fixed device 85 so as to improve the speed of connection. The consequence of this is that, if the mobile device 50 continues to roam and passes another device which, according to the user profile, has no better connection speed (as an example of criterion) then the session is not transferred. Furthermore, it will of course be apparent to the skilled reader that the handover of the session need not be automatic and may be instigated at a user's request.

Returning to FIG. 11, when the mobile device 50 moves into a predetermined range of the fixed device 85, at step 810, the base station E sends a discover device control packet at step 820. On detecting the existence of the preferred fixed device 85, (by accessing the user's personal profile as previously explained, for example), the discover device control packet is used to return the IP address of that preferred device, in this case the fixed device 85, to the base station E. These steps are shown at 830 and 840 in FIG. 11.

Figure 11:
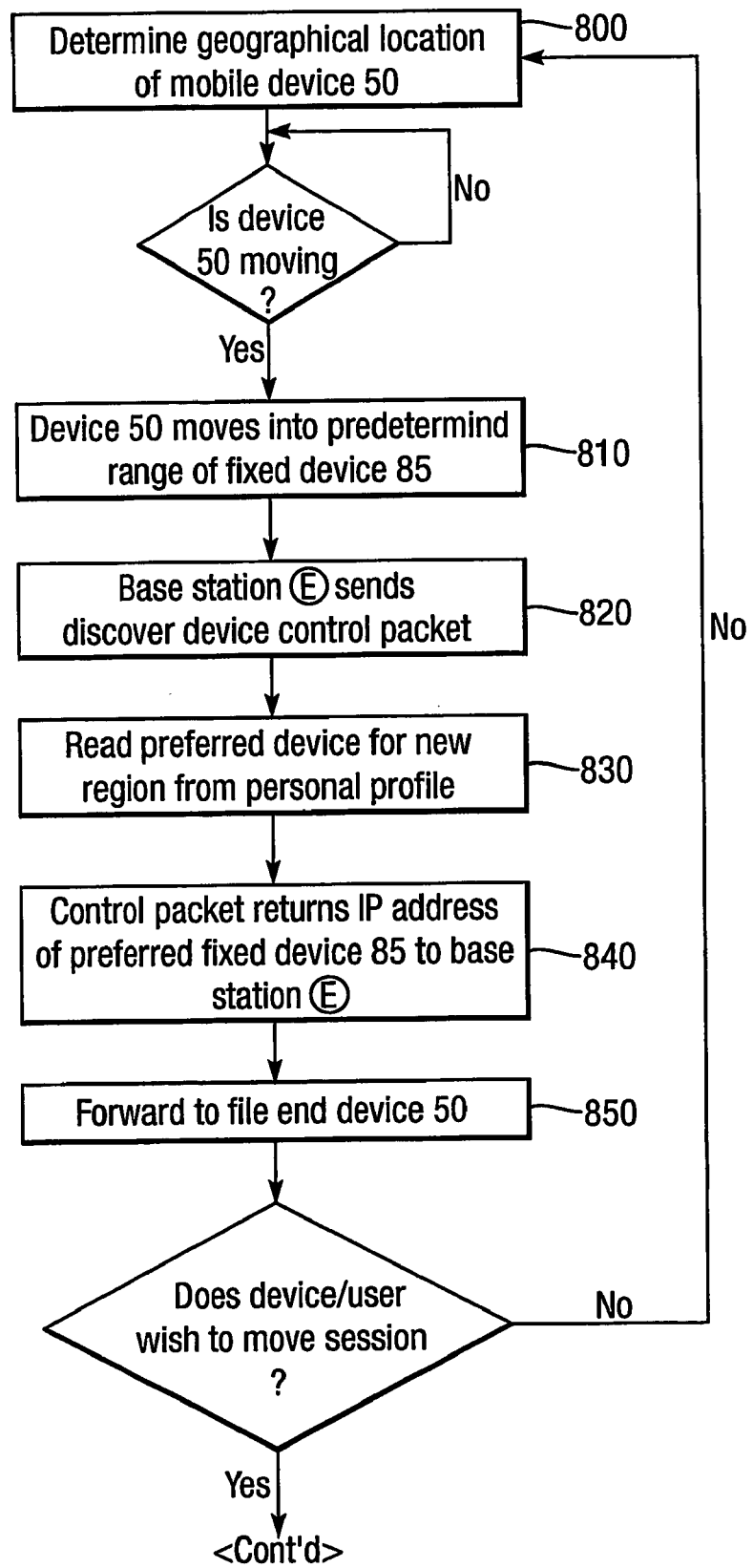
FIG. 11 shows a flow diagram of the movement of a session from a first to a second end device whilst the session is taking place.
Figure 11:
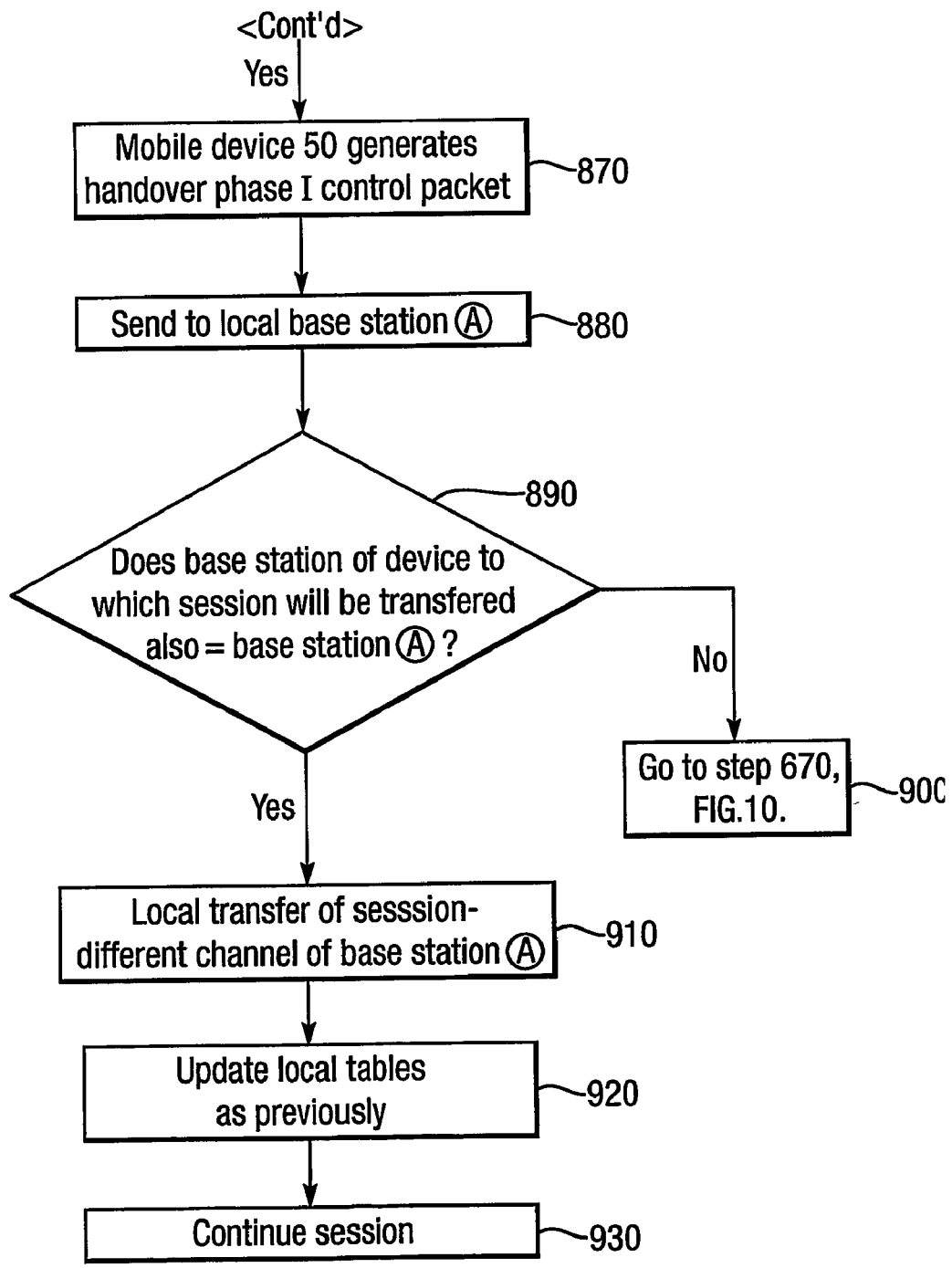

At step 850, in FIG. 11, the discover device control packet is forwarded to the mobile device 50. The mobile device 50 is thus advised of the IP address of the preferred end device, i.e. in this case the IP address of the fixed device 85.

The mobile device 50 is also advised, via the discover device control packet, of the identity of the base station which manages the preferred end device. In the present example, the fixed device 85 is connected to the network 10 via "base station" E (in fact, it is more likely that the node E is a bridge or other fixed access connector to, for example, an Internet service provider).

Mobile device 50 can now initiate session handover, if the user of that device decides that this is desirable (even if there is another more preferred device located, there is no compulsion to switch the session in preferred embodiments—see step 860 in FIG. 11). Session handover is initiated at step 870 by the generation, at mobile device 50, of a handover phase I control packet. This handover phase I control packet is forwarded to the base station A at step 880.

The base station A then determines whether the end device to which the session is to be transferred is also local to the base station A (step 890). If it is not, as with the fixed device 85 which is attached to base station E, then the remainder of the session transfer takes place in accordance with the remainder of the procedure where the mobile device 50 roams between cells in a mobile network. Specifically, at step 900, the procedure moves to step 670 of FIG. 10.

Should the device to which the session is to be transferred also be connected to the base station of the device from which the session is to be transferred, then local session transfer occurs (step 910); no packets need to be transferred between different base stations. The device (for example, the laptop 40 in FIG. 1) is connected likewise to base station A but via a different communication channel 60. Transfer then proceeds as previously described—the local tables in the base station A and also at the end device (here, laptop 40) must be updated at step 920 by splicing the information regarding the session as occurring via the mobile device 50 to the new communication channel/new device (laptop 40) IP address.

Figure 12:
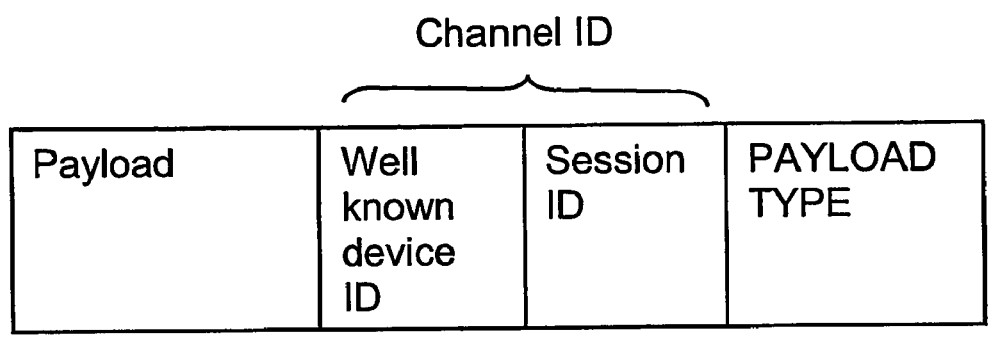
FIG. 12 shows a modified session data packet in accordance with an alternative aspect of the present invention, for use with such a mixed media end device.

It is envisaged that end devices will ultimately comprise a hybrid mix of media specific end devices that co-operate to behave as a single logical device. Such a "mixed media" device is indicated schematically at 100 in FIG. 1. In order to accommodate such devices in as efficient a manner as possible, it then becomes appropriate for the different types of media content carried by a session packet to be routed to an appropriate end device. Such a procedure may be achieved using an extension of the session packet concept as will be understood by reference to FIG. 12. In FIG. 12, a modified session packet is shown and it may be seen that, instead of just a session ID with the indicator fields (FIG. 5), the session data packet now includes both a session ID and a well known device ID along with the payload type. The session ID and well known device ID together are referred to as a channel ID. The use of the well known device ID in the modified session packet of FIG. 12 is considered to be optional and so its use is indicated by a pre-allocated payload type of code the session ID is used in exactly the same way as previously described. The well known device ID, however, is added by the sending application according to which type of media it inserts into a session packet. For example, if the payload is video, the well known ID for a video monitor is inserted. For an audio payload, the well known ID for an audio player is employed instead and so forth.

For ease of explanation, it is assumed that the physical end devices which comprise the single logical device 100 are each attached to the same base station but via their own individual wireless or fixed network interface as necessary. For reasons that will be explained below, all end devices now have an entry included in the device profile category of their information table, to indicate whether they are a user device or a network device. This addition is shown underlined in FIG. 13, which shows the modified end device information table for use with a mixed media device.

Whenever an end device becomes active, a slightly modified form of the previously described device activation procedure (FIGS. 6 to 8) is invoked. The modification is that the base station registers such devices with the appropriate local network or user device profile databases. For a user device connecting to the base station, the additional modification is that a base station polls the local network and/or user device profile databases to discover which communication channels have been allocated to media-specific devices that are in close proximity to the user. GPS information provided by a smart badge, for example, could be used to inform the base station of a user's geographical position. A database search could, for example, be based on user preference or a default list of well known device IDs. For the particular example being considered here, the channel information returned by the database search is entered into the receiving portion of the base stations information table under the entry for the IP address associated with the particular logical device. In addition, an entry is inserted into the general information sub-category to indicate which well known devices are currently within range of the user or user device. These additions to the base stations information table are shown underlined in FIG. 14, which shows a modified base station information table for use with mixed media devices.

The established communication procedure previously described in connection with FIGS. 6 to 8 must also be modified slightly to take account of mixed media communication. The modification is that the phase III established communication procedure may need now to include the step of sending a mixed media control message to inform the sending end of the type of well known device which is available to the called user. Alternatively interrogation of user profile may remove need of this. The sending end then uses this information to decide which types of media it should or should not send. Whenever a base station receives a session packet containing a channel ID header, it uses the well known device ID portion to determine which communication channel this packet should be sent upon.

If the user device moves base station, then the handover process described in connection with FIG. 10 is invoked. Otherwise, it simply polls the appropriate device profile database as it traverses the geographical domains that these databases serve. The information obtained would then be used to update the appropriate well known device entries in the receiving portion of the base stations session information table as shown in FIG. 14. If this change affects the type of well known device available to the user, the mixed media control message is then invoked if necessary to inform the sending end of the changes. The sending end then adapts as necessary.

The channel ID concept described above is likely to have application for certain aspects of providing inter-working between fixed and symbiotic networks.

If an end device is running a reliable transmission and congestion control protocol, an enhancement which could be provided is to provide some handover intelligence. In essence, when an end device detects that handover is being invoked, it informs the other end to suspend transmission. Once handover is completed, it would then be instructed to resume transmission. This would minimize packet loss due to handover uncertainties and hence avoid unnecessary retransmissions.

If, after handing over between base stations, it is necessary (for whatever reasons) to find the point within the network where the original route and the new one diverge, the following procedure could be supported. On being informed of the new IP address to use, the remote base station could send a route-divergence-point control packet to this address. This control packet would contain the old IP address and, at each network node, a route look-up would be carried out for both the old and the new IP addresses. If the next-hop IP address is the same for both addresses, then the route-divergence-point control packet is forwarded to the next network node in the usual way. This process continues node-by-node until the old and new IP addresses return different next-hop addresses. This difference identifies the network node at which the original route and new one diverge. One particular context that may need such a feature is Quality-of-Service support. For example, assuming two end devices are communicating over a reserved-bandwidth communication-channel, then if either of these devices change base stations, then the bandwidth reservation must be modified. One way of achieving this would be to discover the route-divergence-point and then send a bandwidth teardown message along the old route, and a bandwidth reservation message along the new one.

Whilst a number of specific embodiments have been described, it is to be understood that these are by way of reference only and that various modifications may be made without departing from the scope of the invention which is defined in the appended claims. Specifically, whilst the embodiment described refers to a connection between an end device attached to a first base station, and another end device attached to a different base station, it is simplest form, the invention allows connection between two end devices each of which are connected to the same base station. Furthermore, the concept of an 'end device' is not limited to client devices such as laptop or personal computers (although the invention finds particular use with such devices). The end devices may instead be server devices, hubs or other router devices.

What is claimed is:

1. A method of communication between end devices connected to a telecommunications network, the network comprising a local network access point having a plurality of assignable communications channels, a remote network access point to which the remote end device is connected, the remote network access point also having a plurality of assignable channels, the method comprising:

allocating a communications channel to each of the end devices connected to the network;

maintaining, at the local network access point, a local network access point table which cross-references each allocated channel with an identification of the end device to which it is allocated;

maintaining, at each end device to which a communication channel has been allocated, an end device table which contains the allocated communications channel identifier for that end device;

selecting, at an initiating end device, a first session identifier (session ID) from a first array comprising at least one assignable session ID;

adding the first session ID to the end device table of the initiating end device;

forwarding the first session ID from the initiating end device to the network access point;

forwarding, from the initiating end device to the local network access point, a remote end device identifier, indicative of the identity of a remote end device with which the initiating end device is to communicate;

updating the initiating end device table with the remote end device identifier and with the first session ID;

returning a communication commencement request to the initiating end device;

transferring data as a plurality of packets each of which contains the first session ID, between said initiating end device and said remote end device via the local network access point;

allocating a communications channel for the remote network access point to each of the end devices connected to the network via said remote network access point and maintaining, at the remote network access point, a remote network access point table which cross-references the channels allocated to these devices connected to the network via said remote network access point with a corresponding end device identifier;

wherein the remote end device is Internet Protocol (IP) enabled, the local and remote access point tables being maintained with cross references for each allocated channel with a corresponding IP address assigned by the local and remote network access point tables respectively, and wherein the remote end device identifier is an IP address assigned by the said remote network access point, the method further comprising:

forwarding data to be transferred from the initiating end device to the local network access point as a plurality of session packets each including the said first session ID;

encapsulating, at the local network access point the data within each session packet into a transport layer packet such as TCP or UDP;

inserting the first session ID into each said transport layer packet;

encapsulating each transport layer packet into an Internet Protocol packet; and forwarding each IP packet to said remote network access point for transmission to said remote end device.

2. The method of claim 1, further comprising: searching the remote network access point table of the remote network access point upon receipt of an IP packet; and forwarding that IP packet to the remote end device as is, if said searching step indicates that the IP address in the IP packet is not found in the list of IP addresses held by said remote network access point table.

3. The method of claim 1, further comprising: searching the remote network access point table of the remote network access point upon receipt of an IP packet;

transferring the data within the IP packet received at said remote network access point into a session packet when said searching step determines that the IP address in the received IP packet is found in the list of IP addresses held by said remote network access point table; and forwarding the session packet to the remote end device on the basis of the IP address of the remote end device located in the remote network access point table.

4. The method of claim 1, wherein the step of returning a communication commencement request to the initiating end device is initiated from said remote network access point.

5. A method of communication between end devices connected to a telecommunications network, the network comprising a local network access point having a plurality of assignable communications channels, a remote network access point to which the remote end device is connected, the remote network access point also having a plurality of assignable channels, the method comprising:

allocating a communications channel to each of the end devices connected to the network;

maintaining, at the local network access point, a local network access point table which cross-references each allocated channel with an identification of the end device to which it is allocated;

maintaining, at each end device to which a communication channel has been allocated, an end device table which contains the allocated communications channel identifier for that end device;

selecting, at an initiating end device, a first session identifier (session ID) from a first array comprising at least one assignable session ID;

adding the first session ID to the end device table of the initiating end device;

forwarding the first session ID from the initiating end device to the network access point;

forwarding, from the initiating end device to the local network access point, a remote end device identifier, indicative of the identity of a remote end device with which the initiating end device is to communicate;

updating the initiating end device table with the remote end device identifier and with the first session ID;

returning a communication commencement request to the initiating end device;

transferring data as a plurality of packets each of which contains the first session ID, between said initiating end device and said remote end device via the local network access point;

allocating a communications channel for the remote network access point to each of the end devices connected to the network via said remote network access point; and maintaining, at the remote network access point, a remote network access point table which cross-references the channels allocated to these devices connected to the network via said remote network access point with a corresponding end device identifier;

wherein the remote end device is or is not IP enabled, the local and remote access point tables being maintained with cross-references for each allocated channel with a corresponding IP address assigned by the local and remote network access point tables respectively, and wherein the remote end device identifier is an IP address assigned by said remote network access point, the method further comprising:

sending the first session ID along with an identification of said remote end device to said remote network access point;

allocating at said remote network access point, a second session ID from a second array comprising at least one assignable session ID;

updating the remote network access point table with the allocated second session ID such that said first and second session IDs are mapped to one another; and forwarding said second session ID to the remote end device;

the step of transferring data as a plurality of packets further comprising:

transferring each packet between the initiating end device and a remote network access point via the local network access point along with said first session ID, and transferring each said packet between the remote fixed access device and the remote end device using the mapping of said first to said second session ID.

6. The method of claim 5, wherein each packet is transferred between the remote network access point and the initiating end device, via said first end device, as a session packet including said first session ID within a header portion of each said session packet, and between said remote end device and the remote network access point as a session packet including said second session ID within said header portion thereof, the method further comprising:

replacing, at the remote network access point, said first session ID in said session packet with the mapped second session ID when said session packet has arrived from said initiating end device.

7. A method of communication between end devices connected to a telecommunications network, the network comprising a local network access point having a plurality of assignable communications channels, a remote network access point to which the remote end device is connected, the remote network access point also having a plurality of assignable channels, the method comprising:

allocating a communications channel to each of the end devices connected to the network;

maintaining, at the local network access point, a local network access point table which cross-references each allocated channel with an identification of the end device to which it is allocated;

maintaining, at each end device to which a communication channel has been allocated, an end device table which contains the allocated communications channel identifier for that end device;

selecting, at an initiating end device, a first session identifier (session ID) from a first array comprising at least one assignable session ID;

adding the first session ID to the end device table of the initiating end device;

forwarding the first session ID from the initiating end device to the network access point;

forwarding, from the initiating end device to the local network access point, a remote end device identifier, indicative of the identity of a remote end device with which the initiating end device is to communicate;

updating the initiating end device table with the remote end device identifier and with the first session ID;

returning a communication commencement request to the initiating end device;

transferring data as a plurality of packets each of which contains the first session ID, between said initiating end device and said remote end device via the local network access point;

allocating a communications channel for the remote network access point to each of the end devices connected to the network via said remote network access point; and maintaining, at the remote network access point, a remote network access point table which cross-references the channels allocated to these devices connected to the network via said remote network access point with a corresponding end device identifier;

wherein the step of sending the first session ID and the identification of said remote end device further comprises sending an application identifier which identifies an application to be employed by said remote end device, the method further comprising:

ascertaining, at the remote network access point and on the basis of the received application identifier, whether the remote end device is capable of accepting the request to employ said application; and forwarding data from the initiating device for use by said application in the event that the remote end device is capable of accepting the request.

8. The method of claim 7, wherein said remote network access point table maintains a list of available applications for said remote end device, the step of ascertaining whether the remote end device is capable of accepting the request comprising determining from said remote network access point table whether the received application identifier is compatible with said list of available applications for said remote end device.

9. The method of claim 7, wherein said application identifier is a well known port number.

10. The method of claim 7, further comprising:

maintaining, in the remote network access point table, a list of the number of parallel sessions supportable by said remote end device along with a list of the number of those parallel sessions already taking place, and forwarding said data in the event that the remote end device has at least one available session as determined from said remote network access point table.

11. The method of claim 7, further comprising:

maintaining, in a remote end device table, a list of the number of parallel sessions supportable by said remote end device along with a list of the number of those parallel sessions already taking place; and forwarding said list within said remote end device table to the remote network access point table at least when said remote end device table is updated in this respect.

12. The method of claim 5, wherein the step of returning a communication commencement request to the initiating end device is initiated from said remote end device.

13. A method of communication between end devices connected to a telecommunications network, the network comprising a local network access point having a plurality of assignable communications channels, a remote network access point to which the remote end device is connected, the remote network access point also having a plurality of assignable channels, the method comprising:

allocating a communications channel to each of the end devices connected to the network;

maintaining, at the local network access point, a local network access point table which cross-references each allocated channel with an identification of the end device to which it is allocated;

maintaining, at each end device to which a communication channel has been allocated, an end device table which contains the allocated communications channel identifier for that end device;

selecting, at an initiating end device, a first session identifier (session ID) from a first array comprising at least one assignable session ID;

adding the first session ID to the end device table of the initiating end device;

forwarding the first session ID from the initiating end device to the network access point;

forwarding, from the initiating end device to the local network access point, a remote end device identifier, indicative of the identity of a remote end device with which the initiating end device is to communicate;

updating the initiating end device table with the remote end device identifier and with the first session ID;

returning a communication commencement request to the initiating end device;

transferring data as a plurality of packets each of which contains the first session ID, between said initiating end device and said remote end device via the local network access point;

allocating a communications channel for the remote network access point to each of the end devices connected to the network via said remote network access point; and maintaining, at the remote network access point, a remote network access point table which cross-references the channels allocated to these devices connected to the network via said remote network access point with a corresponding end device identifier;

wherein the remote end device identifier forwarded from the initiating device is in a first format, the method fun her comprising resolving the remote end device identifier into a second format.

14. A method of communication between end devices connected to a telecommunications network, the network comprising a local network access point having a plurality of assignable communications channels, a remote network access point to which the remote end device is connected, the remote network access point also having a plurality of assignable channels, the method comprising:

allocating a communications channel to each of the end devices connected to the network;

maintaining, at the local network access point, a local network access point table which cross-references each allocated channel with an identification of the end device to which it is allocated;

maintaining, at each end device to which a communication channel has been allocated, an end device table which contains the allocated communications channel identifier for that end device;

selecting, at an initiating end device, a first session identifier (session ID) from a first array comprising at least one assignable session ID;

adding the first session ID to the end device table of the initiating end device;

forwarding the first session ID from the initiating end device to the network access point;

forwarding, from the initiating end device to the local network access point, a remote end device identifier, indicative of the identity of a remote end device with which the initiating end device is to communicate;

updating the initiating end device table with the remote end device identifier and with the first session ID;

returning a communication commencement request to the initiating end device;

transferring data as a plurality of packets each of which contains the first session ID, between said initiating end device and said remote end device via the local network access point;

allocating a communications channel for the remote network access point to each of the end devices connected to the network via said remote network access point; and maintaining, at the remote network access point, a remote network access point table which cross-references the channels allocated to these devices connected to the network via said remote network access point with a corresponding end device identifier;

said method farther comprising ascertaining whether the remote end device is IP enabled or not.

15. A method of communication between end devices connected to a telecommunications network, the network comprising a local network access point having a plurality of assignable communications channels, a remote network access point to which the remote end device is connected, the remote network access point also having a plurality of assignable channels, the method comprising:
   allocating a communications channel to each of the end devices connected to the network;
   maintaining, at the local network access point, a local network access point table which cross-references each allocated channel with an identification of the end device to which it is allocated;
   maintaining, at each end device to which a communication channel has been allocated, an end device table which contains the allocated communications channel identifier for that end device;
   selecting, at an initiating end device, a first session identifier (session ID) from a first array comprising at least one assignable session ID;
   adding the first session ID to the end device table of the initiating end device;
   forwarding the first session ID from the initiating end device to the network access point;
   forwarding, from the initiating end device to the local network access point, a remote end device identifier, indicative of the identity of a remote end device with which the initiating end device is to communicate;
   updating the initiating end device table with the remote end device identifier and with the first session ID;
   returning a communication commencement request to the initiating end device;
   transferring data as a plurality of packets each of which contains the first session ID, between said initiating end device and said remote end device via the local network access point;
   allocating a communications channel for the remote network access point to each of the end devices connected to the network via said remote network access point; and
   maintaining, at the remote network access point, a remote network access point table which cross-references the channels allocated to these devices connected to the network via said remote network access point with a corresponding end device identifier;
   said method further comprising, upon termination of a session, resetting or removing the information held in each table regarding that now terminated session.

16. The method of claim 15, wherein the step of resetting or removing the information is carried out after a predetermined time out period.

17. A method of communication between end devices connected to a telecommunications network, the network comprising a local network access point having a plurality of assignable communications channels, a remote network access point to which the remote end device is connected, the remote network access point also having a plurality of assignable channels, the method comprising:
   allocating a communications channel to each of the end devices connected to the network;
   maintaining, at the local network access point, a local network access point table which cross-references each allocated channel with an identification of the end device to which it is allocated;
   maintaining, at each end device to which a communication channel has been allocated, an end device table which contains the allocated communications channel identifier for that end device;
   selecting, at an initiating end device, a first session identifier (session ID) from a first array comprising at least one assignable session ID;
   adding the first session ID to the end device table of the initiating end device;
   forwarding the first session ID from the initiating end device to the network access point;
   forwarding, from the initiating end device to the local network access point, a remote end device identifier, indicative of the identity of a remote end device with which the initiating end device is to communicate;
   updating the initiating end device table with the remote end device identifier and with the first session ID;
   returning a communication commencement request to the initiating end device;
   transferring data as a plurality of packets each of which contains the first session ID, between said initiating end device and said remote end device via the local network access point;
   allocating a communications channel for the remote network access point to each of the end devices connected to the network via said remote network access point; and
   maintaining, at the remote network access point, a remote network access point table which cross-references the channels allocated to these devices connected to the network via said remote network access point with a corresponding end device identifier;
   wherein the connection point of the remote end device is to be changed from a first remote network access point to a second, different remote network access point, the method further comprising:
   allocating a new remote communications channel for communication between the remote end device and the second remote network access point, the new remote communications channel having an associated new remote communications channel identifier;
   forwarding the new remote communications channel identifier from the second remote network access point to the first remote network access point;
   returning, from the first remote network access point to the second remote network access point, the contents of a first remote network access point table, the new remote communications channel identifier being employed as a routing controller;
   replacing an old remote communications channel identifier, received from the first remote network access point table, with the new remote communications channel identifier;
   adding the contents of the first remote network access point, including the new remote communications channel identifier, to the second remote network access point table; and
   transferring data between the initiating and remote end devices via the local network access point and the second remote network access point.

18. A method of communication between end devices connected to a telecommunications network, the network comprising a local network access point having a plurality of assignable communications channels, a remote network access point to which the remote end device is connected, the remote network access point also having a plurality of assignable channels, the method comprising:

allocating a communications channel to each of the end devices connected to the network;

maintaining, at the local network access point, a local network access point table which cross-references each allocated channel with an identification of the end device to which it is allocated;

maintaining, at each end device to which a communication channel has been allocated, an end device table which contains the allocated communications channel identifier for that end device;

selecting, at an initiating end device, a first session identifier (session ID) from a first array comprising at least one assignable session ID;

adding the first session ID to the end device table of the initiating end device;

forwarding the first session ID from the initiating end device to the network access point;

forwarding, from the initiating end device to the local network access point, a remote end device identifier, indicative of the identity of a remote end device with which the initiating end device is to communicate;

updating the initiating end device table with the remote end device identifier and with the first session ID;

returning a communication commencement request to the initiating end device;

transferring data as a plurality of packets each of which contains the first session ID, between said initiating end device and said remote end device via the local network access point;

allocating a communications channel for the remote network access point to each of the end devices connected to the network via said remote network access point; and maintaining, at the remote network access point, a remote network access point table which cross-references the channels allocated to these devices connected to the network via said remote network access point with a corresponding end device identifier;

wherein the connection point of the initiating end device is to be changed from a first local network access point to a second local network access point, the method further comprising:

allocating a new local communications channel for communication between the initiating end device and the second local network access point, the new local communications channel having an associated new local communications channel identifier;

forwarding the new local communications channel identifier from the second local network access point to the first local network access point;

returning, from the first local network access point to the second local network access point, the contents of a first local network access point table, the new local communications channel identifier being employed as a routing controller;

replacing an old local communications channel identifier, received from the first local network access point table, with the new local communications channel identifier;

adding the contents of the first local network access point, including the new local communications channel identifier to a second local network access point table; and transferring data between the remote and initiating end devices via the remote network access point and the second local network access point.

19. The method of claim 17, wherein the data is removed from a first network access point table once it has been forwarded to a second network access point table.

20. A method of communication between end devices connected to a telecommunications network, the network comprising a local network access point having a plurality of assignable communications channels, a remote network access point to which the remote end device is connected, the remote network access point also having a plurality of assignable channels, the method comprising:

allocating a communications channel to each of the end devices connected to the network;

maintaining, at the local network access point, a local network access point table which cross-references each allocated channel with an identification of the end device to which it is allocated;

maintaining, at each end device to which a communication channel has been allocated, an end device table which contains the allocated communications channel identifier for that end device;

selecting, at an initiating end device, a first session identifier (session ID) from a first array comprising at least one assignable session ID;

adding the first session ID to the end device table of the initiating end device;

forwarding the first session ID from the initiating end device to the network access point;

forwarding, from the initiating end device to the local network access point, a remote end device identifier, indicative of the identity of a remote end device with which the initiating end device is to communicate;

updating the initiating end device table with the remote end device identifier and with the first session ID;

returning a communication commencement request to the initiating end device;

transferring data as a plurality of packets each of which contains the first session ID, between said initiating end device and said remote end device via the local network access point;

allocating a communications channel for the remote network access point to each of the end devices connected to the network via said remote network access point; and maintaining, at the remote network access point, a remote network access point table which cross-references the channels allocated to these devices connected to the network via said remote network access point with a corresponding end device identifier;

wherein the data transfer destination is to be changed from a first remote end device to a second remote end device, the method further comprising:

forwarding a new device remote communications channel identifier for said second remote end device to the remote network access point;

replacing an old device remote communications channel identifier with the new device remote communications channel identifier in the remote network access point table; and transferring data between the second remote end device and the initiating device via the remote network access point and the local network access point.

21. The method of claim 20, further comprising:

detecting the geographical location of the first remote end device; and forwarding the new device remote communications channel identifier to the remote network access point, to start handover to the second remote end device, only when the first remote end device is within a predefined range of the second remote end device.

22. A method of communication between end devices connected to a telecommunications network, the network comprising a local network access point to which an initiating end device is connected, and a remote network access point to which a remote end device is connected, the method comprising:
- selecting, a first session identifier (session ID) from a first array comprising at least one assignable session ID;
- storing first session ID at the network access point;
- forwarding, from the initiating end device to the local network access point, a remote end device identifier, indicative of the identity of a remote end device with which the initiating end device is to communicate;
- updating an initiating end device table with the remote end device identifier and with the first session ID; and
- transferring data as a plurality of packets each of which contains the first session ID;
- sending the first session ID along with an identification of said remote end device to said remote network access point;
- allocating at said remote network access point, a second session ID from a second array comprising at least one assignable session ID;
- updating a remote network access point table with the allocated second session ID such that said first and second session IDs are mapped to one another; and
- forwarding said second session ID to the remote end device;
- the step of transferring data as a plurality of packets further comprising: transferring each packet between the initiating end device and the remote network access point via the local network access point along with said first session ID, and transferring each said packet between the remote fixed access device and the remote end device using the mapping of said first to said second session ID;
- said method further comprising transmitting an indicator of a data type between the end devices.

23. The method of claim 22, wherein the data type indicator forms a part of a header for each of the said packets to be transferred.

24. The method of claim 22, further comprising selecting a medium in which the transferred data is to be handled, the selection taking place on the basis of the data type indicator.

* * * * *